(12) United States Patent
Halbert et al.

(10) Patent No.: US 10,663,571 B2
(45) Date of Patent: May 26, 2020

(54) RADAR SYSTEM AND ASSOCIATED APPARATUS AND METHODS

(71) Applicants: Max Peter Halbert, Cambridge (GB); Mohammed Jahangir, Cambridge (GB); Gordon Oswald, Cambridge (GB)

(72) Inventors: Max Peter Halbert, Cambridge (GB); Mohammed Jahangir, Cambridge (GB); Gordon Oswald, Cambridge (GB)

(73) Assignee: AVEILLANT LIMITED, Reading, Berkshire (GB)

( * ) Notice: Subject to any disclaimer, the term of this patent is extended or adjusted under 35 U.S.C. 154(b) by 478 days.

(21) Appl. No.: 14/915,571

(22) PCT Filed: Aug. 28, 2014

(86) PCT No.: PCT/GB2014/052612
§ 371 (c)(1),
(2) Date: Feb. 29, 2016

(87) PCT Pub. No.: WO2015/028804
PCT Pub. Date: Mar. 5, 2015

(65) Prior Publication Data
US 2017/0031013 A1    Feb. 2, 2017

(30) Foreign Application Priority Data

Aug. 28, 2013 (GB) .................................. 1315309.3

(51) Int. Cl.
*G01S 13/00* (2006.01)
*G01S 13/72* (2006.01)
(Continued)

(52) U.S. Cl.
CPC ............ *G01S 13/003* (2013.01); *G01S 7/003* (2013.01); *G01S 7/414* (2013.01); *G01S 7/415* (2013.01);
(Continued)

(58) Field of Classification Search
CPC ....................................................... G01S 13/003
See application file for complete search history.

(56) References Cited

U.S. PATENT DOCUMENTS

| 4,499,468 A | 2/1985 | Montana et al. |
| 5,252,980 A * | 10/1993 | Gray ..................... G01S 13/003 342/107 |

(Continued)

FOREIGN PATENT DOCUMENTS

| EP | 2520946 A1 | 11/2012 |
| WO | 2008/145993 A2 | 12/2008 |

(Continued)

OTHER PUBLICATIONS

International Search Report and Written Opinion for PCT/GB2014/052612, dated Jan. 28, 2015 (12 pages).

(Continued)

*Primary Examiner* — Marcus E Windrich
(74) *Attorney, Agent, or Firm* — Merchant & Gould P.C.

(57) ABSTRACT

A multi-static radar system provides surveillance. The radar system includes a plurality of radar receivers and a plurality of radar transmitters arranged in a multi-static configuration to form at least one radar cell to provide an area of radar coverage within the cell.

30 Claims, 13 Drawing Sheets

(51) Int. Cl.
*G01S 7/00* (2006.01)
*G01S 7/41* (2006.01)
*G01S 13/87* (2006.01)
*G01S 13/524* (2006.01)
*G01S 7/02* (2006.01)

(52) U.S. Cl.
CPC ........ *G01S 13/524* (2013.01); *G01S 13/5244* (2013.01); *G01S 13/726* (2013.01); *G01S 13/878* (2013.01); *G01S 7/023* (2013.01)

(56) References Cited

U.S. PATENT DOCUMENTS

| | | | |
|---|---|---|---|
| 5,264,855 A | 11/1993 | Lammers et al. | |
| 5,268,698 A | 12/1993 | Smith et al. | |
| 5,448,243 A * | 9/1995 | Bethke | G01S 13/87 342/59 |
| 7,619,556 B1 | 11/2009 | McCusker | |
| 8,314,733 B1 | 11/2012 | Malakian et al. | |
| 8,416,123 B1 | 4/2013 | Mitchell et al. | |
| 8,654,002 B2 | 2/2014 | Lesturgie | |
| 8,742,977 B1 * | 6/2014 | Piesinger | A01M 29/16 342/159 |
| 9,081,092 B1 | 7/2015 | Friesel | |
| 2004/0075605 A1 * | 4/2004 | Bradford | G01S 7/4004 342/95 |
| 2004/0090363 A1 | 5/2004 | Barrick et al. | |
| 2006/0238407 A1 * | 10/2006 | Bourdelais | G01S 7/411 342/90 |
| 2008/0102756 A1 * | 5/2008 | Lehtinen | G01S 5/00 455/67.11 |
| 2010/0079330 A1 * | 4/2010 | Venkatachalam | G01S 13/003 342/59 |
| 2010/0164785 A1 | 7/2010 | Gebert et al. | |
| 2010/0265122 A1 * | 10/2010 | Oswald | G01S 7/414 342/136 |
| 2011/0140949 A1 | 6/2011 | Lee | |
| 2011/0215961 A1 * | 9/2011 | Moruzzis | G01S 7/003 342/90 |
| 2011/0241928 A1 | 10/2011 | Oswald et al. | |
| 2011/0260907 A1 * | 10/2011 | Roche | G01S 7/415 342/27 |
| 2011/0260908 A1 * | 10/2011 | New | G01S 7/023 342/59 |
| 2012/0019407 A1 * | 1/2012 | Lesturgie | G01S 13/003 342/36 |
| 2012/0056772 A1 * | 3/2012 | Jaffer | G01S 7/023 342/99 |
| 2012/0105272 A1 * | 5/2012 | Moruzzis | G01S 7/414 342/159 |
| 2012/0127024 A1 | 5/2012 | Takashima et al. | |
| 2012/0268314 A1 | 10/2012 | Kuwahara et al. | |
| 2012/0306686 A1 | 12/2012 | Millet et al. | |
| 2013/0176161 A1 * | 7/2013 | Derham | G01S 13/04 342/27 |
| 2014/0253368 A1 * | 9/2014 | Holder | G01S 13/003 342/146 |
| 2015/0061916 A1 | 3/2015 | Sinclair | |
| 2017/0285158 A1 | 10/2017 | Halbert et al. | |

FOREIGN PATENT DOCUMENTS

| | | |
|---|---|---|
| WO | 2009/144435 A1 | 12/2009 |
| WO | 2010/016029 A1 | 2/2010 |

OTHER PUBLICATIONS

UK Search Report for GB 1315309.3, dated Feb. 28, 2014 (2 pages).
International Search Report and Written Opinion for PCT/GB2015/050526, dated Jul. 1, 2015.

* cited by examiner

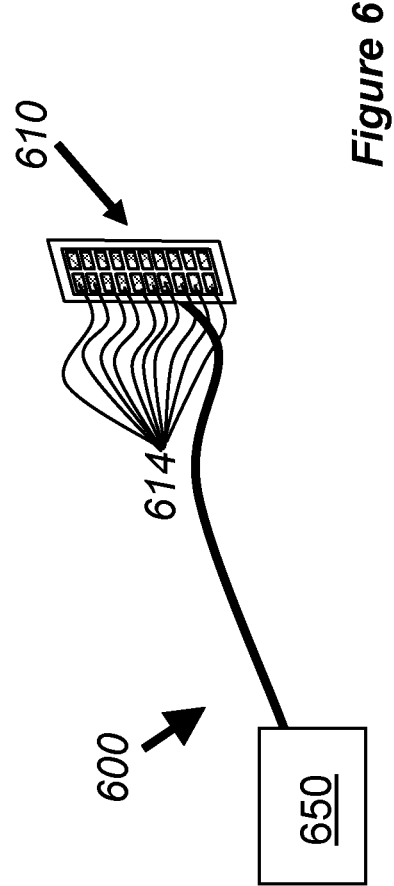

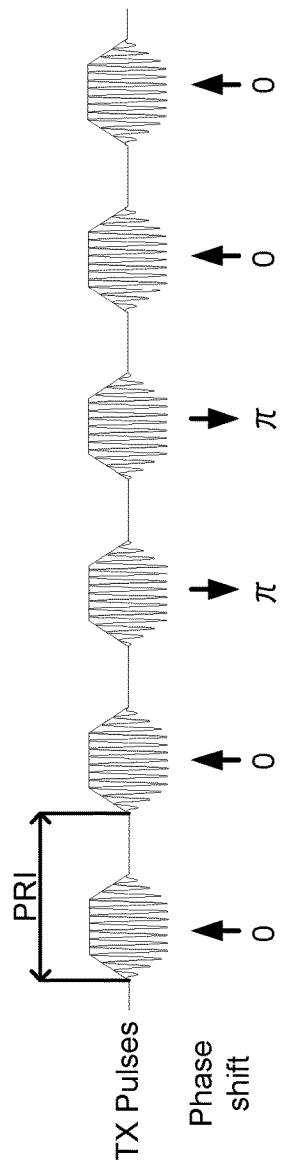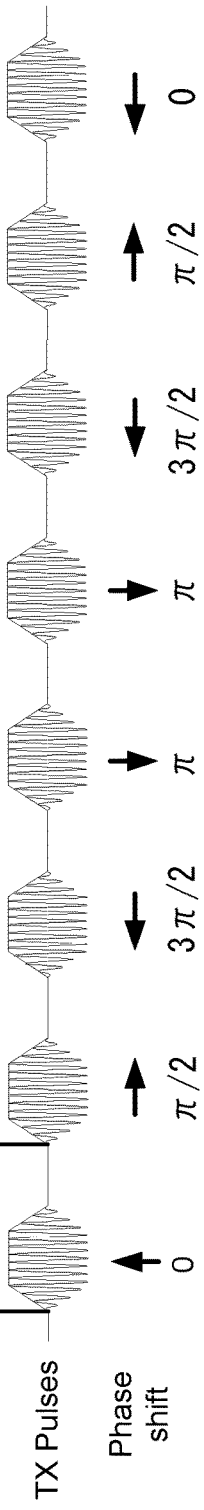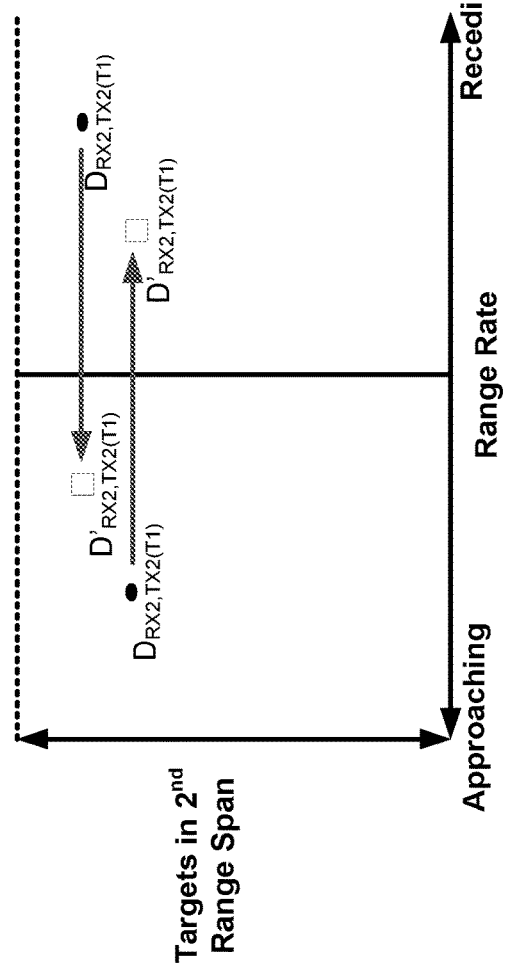
Figure 7(a)
Figure 7(b)
Figure 7(c)

RADAR SYSTEM AND ASSOCIATED APPARATUS AND METHODS

This application is a National Stage Application of PCT/GB2014/052612, filed 28 Aug. 2014, which claims benefit of 1315309.3, filed 28 Aug. 2013 in the United Kingdom, which applications are incorporated herein by reference. To the extent appropriate, a claim of priority is made to each of the above disclosed applications.

BACKGROUND OF THE INVENTION

The present invention relates to a radar system and to associated apparatus and methods. The invention has particular although not exclusive relevance to air surveillance radar.

The UK Government is currently involved in a Spectrum Release Programme to release parts of the reserved communication spectrum for use by other users. Currently investigations are being carried out into possible reductions in spectrum occupancy by primary surveillance radar used for air traffic control purposes and the like. Similar investigations are being carried out in other countries.

There is, therefore, a general need for radar technology which allows the spectrum used by existing primary surveillance radar (typically in the so called 'S' band—2 GHz to 4 GHz) to be released without materially reducing (and even possibly improving) air surveillance capability.

SUMMARY OF THE INVENTION

The present invention seeks to provide a radar system and associated apparatus and methods for meeting or at least partially contributing to the above need.

In one aspect of the invention there is provided a multi-static radar system for providing surveillance, the radar system comprising: a plurality of radar receivers and a plurality of radar transmitters arranged in a multi-static configuration to form at least one radar cell to provide an area of radar coverage within said cell; wherein each radar transmitter is a static transmitter operable to persistently illuminate a respective radar cell with a radar signal; wherein each transmitter is synchronised or controlled as a part of the radar system; wherein each radar receiver is a static receiver operable to receive radar signals from within a respective radar cell, including radar return signals echoed from any object within said respective radar cell, as a result of illumination of said radar cell by at least one corresponding radar transmitter located remotely from that radar receiver; and means for processing the respective radar signals received at each radar receiver to determine information relating to at least one of position and motion of said object.

The radar transmitters may be arranged such that, in operation, each radar cell is illuminated by at least two radar transmitters.

The radar receivers may be arranged such that, in operation, each radar cell may comprise at least two radar receivers arranged to receive signals from within that radar cell, including radar return signals echoed from any object within the respective radar cell.

The radar cell may comprise a polygonal coverage area having a plurality of vertices at each of which a respective radar transmitter, or radar receiver, may be arranged for illuminating, or receiving radar signals from within, the polygonal coverage area.

The polygonal coverage area may comprise a quadrilateral (e.g. square or rectangular) coverage area.

The quadrilateral polygonal coverage area has a radar receiver located at one vertex thereof and another radar receiver located at a diagonally opposite vertex thereof.

The quadrilateral polygonal coverage area has a radar transmitter located at one vertex thereof and another radar transmitter located at a diagonally opposite vertex thereof.

The polygonal coverage area has a radar receiver located at one vertex thereof and another radar receiver located at a diagonally opposite vertex thereof.

The polygonal coverage area has a radar transmitter located at one vertex thereof and another radar transmitter located at a diagonally opposite vertex thereof.

Each radar transmitter and each radar receiver located at a respective vertex of the polygonal coverage area may be configured together to provide radar coverage that extends beyond the polygonal coverage area.

The radar system may comprise a plurality of radar transmitters arranged to illuminate a radar cell wherein each radar transmitter may be operable to transmit radar pulses of radio waves having the same respective transmission frequency (and/or pulse repetition frequency).

Each radar receiver may be configured to attenuate radar signals received from a direction of the at least one corresponding radar transmitter (e.g. using at least one of shadowing, obscuration, beam nulling, directing and/or signal subtraction), whereby to mitigate against saturation and/or desensitisation, of that radar receiver.

Each radar receiver may be operable to receive radar signals from within a respective radar cell, including radar return signals echoed from any object within the respective radar cell, as a result of illumination of the radar cell by a plurality of radar transmitters located remotely from that radar receiver. It will be appreciated that one, some or all of the plurality of radar transmitters may, nevertheless, be located in proximity to the radar receiver.

The processing means may be operable to distinguish between radar return signals echoed from any object within the respective radar cell as a result of illumination of the radar cell by a first of the plurality of radar transmitters and radar return signals echoed from any object within the respective radar cell as a result of illumination of the radar cell by a second of the plurality of radar transmitters.

The processing means may be provided as part of each radar receiver, the respective part being configured for processing the radar signals received at that radar receiver to determine information relating to at least one of position and motion of the object relative to that receiver.

Radar signals received, by each radar receiver, from a direction of the at least one corresponding radar transmitter may be attenuated, by virtue of the distance between each radar receiver and the at least one corresponding radar transmitter, whereby to mitigate against saturation and/or desensitisation, of that radar receiver.

Each radar receiver may be operable to use signals received from a direction of the at least one corresponding radar transmitter to synchronise the radar receiver with the radar transmitter.

Each radar receiver and each radar transmitter may be operable to synchronise with one another based on signals from another one of said plurality of transmitters.

Each radar receiver and each radar transmitter may be operable to synchronise with one another based on signals from a satellite.

Each radar receiver and each radar transmitter may be operable to synchronise with one another based on signals from a time synchronization system. The time synchronization system may comprise the broadcast of a time-synchronisation signal such as the 'MSF' signal, or 'Time from National Physics Laboratory (NPL)' signal, and/or may allow synchronisation with coordinated universal time (UTC).

The radar receivers may be interconnected via a communication link.

The radar receivers may be interconnected via a high speed (e.g. broad band) communication link.

The radar receivers may be interconnected via a wired communication link.

The plurality of radar receivers and plurality of radar transmitters may be arranged in a multi-static configuration to form a plurality of radar cells to provide an extended area of radar coverage within the plurality of cells.

In one aspect of the invention there is provided a radar transmitter for the multi-static radar system, the radar transmitter comprising the means for persistently illuminating a radar cell with the radar signal.

The radar transmitter may be operable to persistently illuminate the respective radar cell with a radar signal comprising a sequence of radar pulses.

The radar transmitter may be operable to persistently illuminate the respective radar cell with a radar signal comprising a sequence of radar pulses at a predetermined pulse repetition frequency.

The radar system may be configured to detect and determine the information for objects moving up to a maximum range rate and wherein the predetermined pulse repetition frequency may be set sufficiently high to ensure that the range rate of an object moving at the maximum range rate can be determined unambiguously, from the Doppler shift imparted to the radar return signals, by the processing means.

The predetermined pulse repetition frequency may be at least four times the maximum range rate divided by a wavelength of a radio wave used in the radar pulses.

In one aspect of the invention there is provided a radar receiver for the multi static radar system, the radar receiver comprising means for receiving radar signals from a radar cell, including radar return signals echoed from any object within the radar cell, as a result of illumination of the radar cell by at least one radar transmitter located remotely from the radar receiver.

The radar receiver may further comprise processing means for processing the radar return signals echoed from an object and received at the radar receiver to determine the information relating to at least one of position and motion of the object.

The radar receiver may further comprise means for obtaining information relating to at least one of position and motion of the object relative to another radar receiver (e.g. from the another radar receiver or from a server).

The processing means may be operable to determine the information relating to at least one of position and motion of the object based on the information relating to at least one of position and motion of the object relative to another radar receiver.

The processing means may be operable to determine an angular position of the object relative to the radar receiver.

The angular position of the object relative to the radar receiver may comprise an elevation angle of the object relative to the receiver.

The angular position of the object relative to the receiver may comprise an azimuth angle of the object relative to the radar receiver.

The processing means may be operable to determine a position of the object relative to the receiver based on the angular position of the object relative to the radar receiver.

The processing means may be operable to determine a range of the object relative to the receiver.

The range of the object relative to the radar receiver may comprise a bi-static range, representing a combined range: from the radar receiver to the object; and from the object to a radar transmitter that transmitted radar signals that resulted in the radar return signals, echoed from the object, and on which the determination of range may be based.

The processing means may be operable to determine the range of the object relative to the radar receiver from an ambiguous set of at least two possible values for the range.

The processing means may be operable to determine the range, from the ambiguous set of at least two possible values for the range, based on at least one angular position of the object relative to the radar receiver.

The processing means may be operable to determine the range, from the ambiguous set of at least two possible values for the range, based on a phase coding of transmitted radar signals that resulted in the radar return signals, echoed from the object, and on which the determination of range may be based.

The processing means may be operable to determine the range, from the ambiguous set of at least two possible values for the range, based on information relating to at least one of position and motion of the object relative to another radar receiver.

The processing means may be operable to determine a position of the object relative to the receiver based on the range.

The processing means may be operable to determine a range rate of the object.

The processing means may be operable to determine a respective range rate of the object in each of two directions.

The processing means may be operable to determine a velocity magnitude and direction of the object based on the range rates of the object in each of the two directions.

The processing means may be operable to determine the range rate(s) of the object based on a Doppler shift exhibited by the radar return signals received at the radar receiver.

The processing means may be operable to maintain histories for each object detected by the radar receiver.

The histories may comprise at least one of: Doppler, range, range rate, two-dimensional position, three-dimensional position, object tracking, angular position, velocity, and direction histories.

The processing means may be operable to classify each object detected by the radar receiver based on the information relating to at least one of position and motion of the object.

The processing means may be operable to classify an object detected by the radar receiver as at least one of a target of interest or clutter based on the information relating to at least one of position and motion of the object.

In one aspect of the invention there is provided a method performed in a multi-static radar system for providing surveillance, wherein the multi-static radar system comprises a plurality of radar receivers and a plurality of radar transmitters arranged in a multi-static configuration to form at least one radar cell to provide an area of radar coverage within said cell, the method comprising: each radar transmitter persistently illuminating a respective radar cell with a radar signal; each radar receiver receiving radar signals from within a respective radar cell, including radar return signals echoed from any object within said respective radar cell, as a result of illumination of said radar cell by at least one corresponding radar transmitter located remotely from that radar receiver; and processing the respective radar signals received at each radar receiver to determine information relating to at least one of position and motion of said object.

The processing means may be operable to process the radar return signals echoed from within said radar cell and received at the at least one radar receiver: to make a first detection of a target, wherein said first detection results from first radar return signals, originating from one of said transmitters, and echoed from said target; to make a second detection of said target, wherein said second detection results from second radar return signals, originating from another of said transmitters, and echoed from said target; to identify, for each of said first and second detections, from which of said transmitters the radar return signals resulting in that respective detection originated; to determine first positional information for said target based on said first radar return signals resulting in said first detection and information on the transmitter identified to be the originator of said first radar return signals; to determine second positional information for said target based on said second radar return signals resulting in said second detection and information on the transmitter identified to be the originator of said second radar return signals; and to determine refined positional information for said target based on said first and second positional information.

The processing means may be operable: to process the radar return signals echoed from within said radar cell within a first process interval, representative of a first time on target, to detect a target and to provide information relating to said target; to determine, based on said information relating to said target, a second process interval, representative of a second time on target; and to process the radar return signals echoed from within said radar cell within a second process interval, representative of a second time on target, to provide at least one of further and refined information relating to said target.

The processing means may be operable: to process the radar return signals echoed from within said radar cell to derive a Doppler spectrum for said return signals; to filter said Doppler spectrum using a median filter whereby to suppress Doppler spectrum associated with a moving source of radar interference (e.g. wind turbines); and to identify from said filtered Doppler spectrum whether said filtered Doppler spectrum comprises a Doppler signal indicative of a target of interest.

The processing means may be operable: to process the radar return signals echoed from within said radar cell to derive a Doppler spectrum for said return signals; to identify based on said Doppler spectrum, sub-wavelength variations in phase (e.g. micro-Doppler variations) arising from sub-wavelength motion of a target; and to determine target related information based on said sub-wavelength variations in phase.

The processing means may be operable: to process the radar return signals echoed from within said radar cell to make a plurality of substantially simultaneous detections of a target, wherein at least one of said detections of said target is in a main receiver beam and another of said detections of said target in a sidelobe to said main receiver beam; and to determine based on the signal amplitude which of said detections is in said sidelobe and which of said detections is in said main receiver beam.

The processing means may be operable: to process the radar return signals echoed from within said radar cell to make a plurality of substantially simultaneous detections of a target, wherein at least one of said detections of said target arises from radar return signals that are received directly from said target and at least one other of said detections of said target arises from radar return signals that are received indirectly from said target (e.g. via at least one multipath); and to determine which of said detections is received directly and which of said detections is received indirectly.

The processing means may be operable to process the radar return signals echoed from within said radar cell within an adaptive process interval that can be adapted depending on target analysis requirements.

The adaptive processing interval may be extendable to allow enhanced analysis of said target. The adaptive processing interval may be reducible to allow faster target detection.

The processing means may be operable: to process the radar return signals echoed from within said radar cell to make at least one detection of a target; to determine at least one of an ambiguous range rate and an ambiguous range for said target; to resolve ambiguity in said at least one of an ambiguous range rate and an ambiguous range based on a phase coding sequence exhibited by said radar return signals.

The processing means may be operable: to process the radar return signals echoed from within said radar cell to make at least one detection of a target, wherein said radar return signals comprise characteristics that represent dynamic target behaviour; to apply at least one branch of a pre-determined multi-branched model representing dynamic target behaviour to said radar return signals to identify a branch that approximates to the dynamic target behaviour represented by said characteristics, wherein each of a plurality of branches of said multi-branched model represents a different respective dynamic target behaviour; and to derive information relating to said target based on said identified branch of said pre-determined multi-branched model.

In one aspect of the invention there is provided radar system for providing surveillance, the radar system comprising: at least one radar receiver and a plurality of radar transmitters; wherein each radar transmitter is a static transmitter operable to persistently illuminate a common volume of interest with respective radar signals; and wherein the at least one radar receiver is a static receiver operable to continuously observe said common volume of interest to receive radar return signals echoed from a target within said common volume of interest, as a result of said illumination of said common volume of interest by said radar transmitters; and a processor operable to process the radar return signals echoed from within said volume of interest and received at the at least one radar receiver: to make a first detection of said target, wherein said first detection results from first radar return signals, originating from one of said transmitters, and echoed from said target; to make a second detection of said target, wherein said second detection results from second radar return signals, originating from another of said transmitters, and echoed from said target; to identify, for each of said first and second detections, from which of said transmitters the radar return signals resulting in that respective detection originated; to determine first positional information for said target based on said first radar return signals resulting in said first detection and information on the transmitter identified to be the originator of said first radar return signals; to determine second positional information for said target based on said second radar return signals resulting in said second detection and information on the transmitter identified to be the originator of said second radar return signals; and to determine refined positional information for said target based on said first and second positional information.

The radar signals transmitted by each of said plurality of transmitters may comprise a series of radar pulses at a pre-determined pulse repetition frequency (PRF), wherein each said radar pulse may comprise radio waves of a pre-determined frequency, and wherein said pre-determined frequency of said radio waves may be common to each of said plurality of transmitters.

The processor may be operable to identify, for each of said first and second detections, from which of said transmitters the radar return signals resulting in that respective detection originated, for example by: making a respective presumption as to which of said transmitters the radar return signals resulting in each detection originated from; verifying whether said presumptions result in consistent positional or velocity information; and/or when said presumptions result in consistent positional or velocity information, identifying each transmitter from which the radar return signals resulting in a respective detection originated in accordance with said presumption.

The processor may be operable to verify whether said presumption results in consistent positional information by, for example: determining first hypothetical positional information for said target based on said first radar return signals resulting in said first detection and information on the transmitter that said presumption presumes to be the originator of said first radar return signals; determining second hypothetical positional information for said target based on said second radar return signals resulting in said second detection and information on the transmitter that said presumption presumes to be the originator of said second radar return signals; and/or verifying said presumption when said first hypothetical positional information is consistent with said second hypothetical positional information.

In one aspect of the invention there is provided a radar system for providing surveillance, the radar system comprising: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest within a first process interval, representative of a first time on target, to detect said target and to provide information relating to said target; to determine based on said information relating to said target a second process interval, of different length to said first process interval, representative of a second time on target; and to process the radar return signals echoed from within said volume within a second process interval, representative of a second time on target, to provide at least one of further and refined information relating to said target.

The second process interval may overlap at least partially in time with the first process interval. The second process interval may be an extended version of the first process interval.

In one aspect of the invention there is provided a radar system for providing surveillance, the radar system comprising: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from within said volume of interest, as a result of said illumination of said volume of interest by said radar transmitters; and a processor operable: to process the radar return signals echoed from within said volume of interest to derive a Doppler spectrum for said return signals; to filter said Doppler spectrum using a median filter whereby to suppress Doppler spectrum associated with a moving source of radar interference (e.g. wind turbines); and to identify from said filtered Doppler spectrum whether said filtered Doppler spectrum comprises a Doppler signal indicative of a target of interest.

The processor may be operable to identify from said filtered Doppler spectrum whether said filtered Doppler spectrum comprises a Doppler signal indicative of a target of interest by determining whether said filtered Doppler spectrum comprises a Doppler signal that exceeds a predetermined threshold.

The processor may be operable to apply a filter across a plurality of historic Doppler spectrums, for radar return signals, obtained over an extended time period to enhance peaks in the Doppler spectrum that are indicative of a target exhibiting a steady change in Doppler characteristics.

In one aspect of the invention there is provided A radar system for providing surveillance, the radar system comprising: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to derive a Doppler spectrum for said return signals; to identify based on said Doppler spectrum, sub-wavelength variations in phase (e.g. micro-Doppler variations) arising from sub-wavelength motion of said target; and to determine target related information based on said sub-wavelength variations in phase.

In one aspect of the invention there is provided radar system for providing surveillance, the radar system comprising: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to make a plurality of substantially simultaneous detections of said target, wherein at least one of said detections of said target is in a main receiver beam and another of said detections of said target in a sidelobe to said main receiver beam; and to discriminate between said detections by determining based on signal amplitude which of said detections is in said sidelobe and which of said detections is in said main receiver beam.

In one aspect of the invention there is provided a radar system for providing surveillance, the radar system comprising: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to make a plurality of substantially simultaneous detections of said target, wherein at least one of said detections of said target arises from radar return signals that are received directly from said target and at least one other of said detections of said target arises from radar return signals that are received indirectly from said target (e.g. via at least one multipath); and to discriminate between said detections by determining which of said detections is received directly and which of said detections is received indirectly.

The processor may be operable to process the radar return signals echoed from within said volume of interest within an adaptive process interval that can be adapted depending on target analysis requirements.

The adaptive processing interval may be extendable to allow enhanced analysis of said target. The processor may be operable to discriminate between said detections by processing said radar return signals echoed from within said volume of interest using an extended processing interval. The adaptive processing interval may be reducible to allow faster target detection.

In one aspect of the invention there is provided a radar system for providing surveillance, the radar system comprising: at least one radar receiver and at least one radar transmitter; wherein the at least one radar transmitter is a static transmitter operable to persistently illuminate a volume of interest with respective radar signals; wherein said radar signals transmitted by each transmitters comprise a series of radar pulses encoded with a pulse to pulse phase coding sequence; wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to make at least one detection of said target; to determine at least one of an ambiguous range rate and an ambiguous range for said target; to resolve ambiguity in said at least one of an ambiguous range rate and an ambiguous range based on the phase coding sequence exhibited by said radar return signals.

In one aspect of the invention there is provided a radar system for providing surveillance, the radar system comprising: at least one radar receiver and at least one radar transmitter; wherein the at least one radar transmitter is a static transmitter operable to persistently illuminate a volume of interest with respective radar signals; wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to make at least one detection of said target, wherein said radar return signals comprise characteristics that represent dynamic target behaviour; to apply at least one branch of a pre-determined multi-branched model representing dynamic target behaviour to said radar return signals to identify a branch that approximates to the dynamic target behaviour represented by said characteristics, wherein each of a plurality of branches of said multi-branched model represents a different respective dynamic target behaviour; and to derive information relating to said target based on said identified branch of said pre-determined multi-branched model.

Each of a plurality of branches of said pre-determined multi-branched model may comprise a different respective set of phase and/or time shifts.

The processor may be operable to apply said branch that approximates to the dynamic target behaviour represented by said characteristics, by applying the respective set of phase and/or time shifts of that branch to modify said radar return signals, in the time domain, to provide modified radar return signals comprising characteristics that represent a simplified (e.g. first or second order) dynamic target behaviour.

The processor may be operable to derive said information relating to said target derived, based on said modified radar return signals.

Each of a plurality of branches of said pre-determined multi-branched model may comprise a different respective set of frequency domain transforms.

The processor may be operable to apply said branch that approximates to the dynamic target behaviour represented by said characteristics, by applying the respective set of individual frequency domain transformations of that branch to said radar return signals, in the frequency domain, and concatenating said frequency domain transformations to provide an extended coherent frequency domain transformation.

Each said individual frequency domain transformation may represent a predetermined frequency (or frequency bin) for a predetermined dwell time.

The characteristics may represent dynamic behaviour comprising at least one of second order, third order and fourth order motion of said target; and wherein said processor is operable to derive said information relating to said target derived, based on said identified branch of said pre-determined multi-branched model, that characterises said at least one of second order, third order and fourth order motion of said target behaviour.

The processor may be operable to derive information relating to said target derived, based on said identified branch of said pre-determined multi-branched model, that identifies at least one of a target classification, target type and target identity for said detected target.

A field of view within a cell may be illuminated by two or more transmitters and observed by two or more receivers; wherein the field of view is determined by an inclusive combination of receiver-determined fields of view for any combination of said two or more receivers.

In one aspect of the invention there is provided a receiver comprising the necessary features for putting a receiver of any of the radar system aspects into effect.

In one aspect of the invention there is provided a transmitter comprising the necessary features for putting a transmitter of any of the radar system aspects into effect.

Aspects of the invention also extend to the methods performed by any of: the radar system aspects; the radar receiver aspects; and/or the radar transmitter aspects.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

It will be appreciated that the term radar cell used herein refers to any volume of space that is illuminated by a radar transmitter and observed by a radar receiver.

BRIEF DESCRIPTION OF THE DRAWINGS

Embodiments of the invention will now be described by way of example only with reference to the attached figures in which:

FIG. 6 illustrates, in simplified form, a radar transmitter suitable for use in a cell of the radar network of FIG. 1;

FIGS. 7(a) to (c) illustrate, in simplified form, a coding technique that may be used a cell of the radar network of FIG. 1 to help resolve range ambiguities;

DETAILED DESCRIPTION OF THE INVENTION

Figure 1:
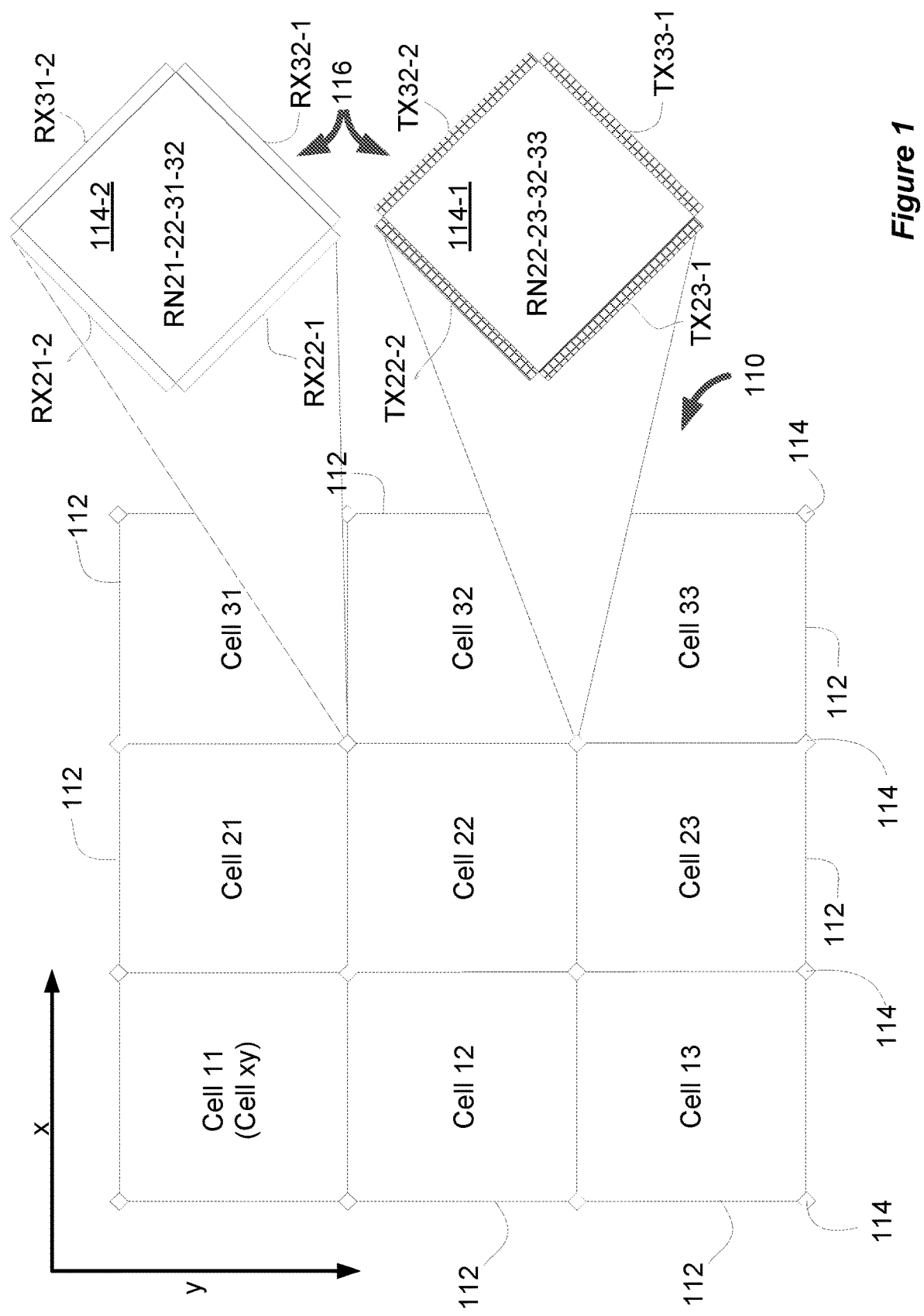
FIG. 1 schematically illustrates, in simplified form, a radar network suitable for providing air surveillance.

FIG. 1 shows, generally at 110, an idealised radar network suitable for providing air surveillance for applications such as air traffic control (ATC) or air defence. The radar network 110 comprises a plurality of radar cells 112 with each radar cell 112 providing its own respective local geographic area of radar coverage. The radar cells 112 are arranged (or 'tiled') generally adjacent one another to provide a total surveillance area comprising a much larger geographic area of radar coverage (albeit that the actual areas of coverage provided by the radar receivers/transmitters of each cell may, in reality, overlap partially with one another).

Each radar cell 112 is formed by a respective multi-static arrangement of static radar receivers (RX) and static radar transmitters (TX) with each receiver/transmitter being located at a different respective radar node 114. The radar nodes 114 of each cell are arranged in a polygonal arrangement with each radar node 114 being located at a different respective vertex of the polygonal arrangement.

In this example of FIG. 1, each radar node 114 is located at a different respective corner of a quadrilateral (a square) and each radar cell 112 is formed by a multi-static arrangement of two radar receivers (RX) and two radar transmitters (TX). The exemplary radar network 110 comprises nine cells arranged in a regular three by three arrangement with each radar cell 112 (labelled 'Cell rc' where r is the row number and c is the column number) being square (although the actual area of radar coverage will extend beyond the boundaries of the square radar cell 112).

In FIG. 1, simplified expanded views of two of the radar nodes 114-1 and 114-2 are shown generally at 116. The radar nodes 114-1 and 114-2 illustrated in the expanded view are nodes located at the mutual vertices of four radar cells 112. Node 114-1, for example, is at the vertices of the cells labelled Cell 22, Cell 23, Cell 32 and Cell 33, and is labelled RN22-23-32-33 accordingly. Node 114-2, for example, is at the vertices of the cells labelled Cell 21, Cell 22, Cell 31 and Cell 32, and is labelled RN21-22-31-32 accordingly. As illustrated in the expanded view, radar node 114-1 comprises four radar transmitters TX22-2, TX23-1, TX32-2, and TX33-1 (one for each of Cells 22, 23, 32 and 33). As illustrated in the expanded view, radar node 114-2 comprises four radar receivers RX21-2, RX22-2, RX31-1 and RX32-2 (one for each of Cells 21, 22, 31 and 32). It will be appreciated that, whilst a radar node having purely transmitter or receiver functionality for multiple cells is particularly beneficial for a regular tiled arrangement as shown in FIG. 1, in practice separate radar nodes 114 may be used for different radar cells 112. Each radar node may thus comprise a single radar transmitter or radar receiver for a single radar cell 112.

Beneficially, each radar transmitter TX is a static transmitter that is arranged to illuminate its respective cell 112 with a continuous stream of radio pulses at a predefined pulse repetition frequency (PRF) (i.e. having a predefined pulse repetition interval PRI) persistently, without scanning.

Similarly, each receiver RX is a static receiver arranged to observe an entire field of view (including the coverage area of its radar cell 112) persistently without scanning and to receive reflections of pulses that are returned by targets in its radar cell 112. Each radar receiver RX is provided with an associated processing capability which is configured to process the reflections of pulses returned from within its radar cell 112 to determine information about the target from which the reflected signals are returned. The information that can be obtained includes positional information suitable for identifying the three dimensional position of the target (e.g. range, azimuth and elevation) and movement information identifying how the target is moving within the radar cell 112 relative to the radar receiver RX (e.g. heading and velocity) using high-precision unambiguous Doppler. The parametric history for a target is stored and maintained including, for example, tracking information (positional history) and/or Doppler history. The detailed signal information including high-precision, unambiguous, Doppler histories that result for each target are used to track and classify each target.

Each receiver is designed to receive a wide dynamic range of signals within a tightly-controlled band, and to reject others strongly.

The radar receivers RX are connected, via a high speed communication link, to one another and to a server (not shown) where the positional and movement information from each radar cell 112 is collated in order to track the movement of targets of interest throughout the entire surveillance area covered by the radar cells 112 (e.g. as part of a broadband data network). The radar receivers RX of a particular cell 112 are also able to share, via the communication link (either directly or indirectly via the server) respective information relating to a target detected in that cell obtained by each radar receiver RX of that cell. This allows each radar receiver RX of the radar cell 112 to refine the positional and/or movement information derived for the target and to resolve any ambiguities.

In this example, the greatest proportion of computing power is provided at each receiver RX, and data communications consistent with modern broadband networks are sufficient to transport messages beyond the receiver to the server and/or other receivers.

This approach is similar to techniques, used for so called 'holographic' radar (HR), which are described in the International Patent Application having publication number WO2008/145993 and International Patent Application having publication number WO2009/144435 the contents of both of which documents are hereby incorporated by reference. The holographic radar is configured to illuminate a particular volume of space persistently rather than in the discontinuous manner of scanning radar systems. Information contained in signals returned from the volume being illuminated is not, therefore, lost as a result of scanning discontinuity. The holographic radar measures aircraft positions using intense, but technically realistic, computational processing. Such discontinuities, caused by scanning, can make target resolution, in the presence of clutter (especially wind farm related clutter), difficult and in some cases impossible. The holographic radar is able to accurately measure aircraft (and other target) positions using intense, but technically realistic, computational processing.

For a radar configuration having a particular combination of operating frequency ($F_{op}$), Pulse Repetition Frequency (PRF), target range (R), and radial speed ($V_r$), radar target information can be said to be effectively 'continuous' or 'persistent' and its Doppler shift unambiguous if, where 'c' is the speed of light, it is sampled:

(a) at a rate exceeding the Nyquist rate for the Doppler shifts engendered by the target, that is at a PRF greater than $[4 \times F_{op} \times V_r/c]$; and (b) without interruption. In this case $V_r > [c \times PRF/(4 \times F_{op})]$ Range information is unambiguous if the target is at a range less than a maximum ($R_{max}$) where $R_{max} = [c/(2 \times PRF)]$.

This is achieved if for the radar configuration where the target ranges (R) and radial speed ($V_r$) lie within the maximum values $R_{max}$ and $V_{rmax}$ such that:

(a) $R_{max} \times V_{rmax} < [c^2/(8 \times F_{op})]$; and (b) $[c/(2 \times Rmax)] > PRF > [4 \times F_{op} \times V_{rmax}/c]$, This is the ideal situation for the holographic radar (HR) (e.g. as described in the International Patent Application having publication number WO2008/145993 and International Patent Application having publication number WO2009/144435).

However, the inequalities for unambiguous range and range rate defined above place limits on maximum range and radial speed that may not always be convenient within typical mission requirements (range and speed) and normally available operating frequencies for surveillance radar. Lower frequencies are preferred to achieve high range and speed. For example, for operation at L band (1215-1350 MHz for aeronautical radio determination), for aircraft flying at 600 kts, this would impose a range limit in the region of 15 Nautical Miles (nm). This is short with respect to many surveillance radar requirements. On the other hand if the pulse repetition frequency is set low enough to achieve unambiguous range of say 40 nm, the Doppler shift for high speed targets may exceed the Nyquist criterion for that PRF.

The exemplary radar receivers described herein are advantageously configured, in any of a number of different ways, to resolve any such ambiguity.

Beneficially, the frequency of the radio waves transmitted in each pulse from each radar transmitter, and observed by each radar receiver is maintained the same (or is restricted to a small selection of frequencies across a small frequency band) for the entire radar network 110, using a resolution bandwidth in the region of 1 MHz (or less) which is equivalent to an occupied bandwidth of approximately 2 MHz. The frequency used, in this example, is located in the so called 'L' band (1 to 2 GHz).

For the purposes of spectrum release, therefore, it can be seen that the radar network 110 beneficially allows non-cooperative surveillance to move out of the S band, and to occupy a minimal spectrum, using an integrated network of radar sensors operating on, and occupying only a single frequency (or a small range of frequencies), in the L band. This will beneficially allow release of the S band spectrum. The high quality of target information allows targets to be resolved based on their Doppler history, not by means of raw range resolution. This allows spectrum use to be optimised and concentrated in a single, narrow band.

Time on target is not limited by beam scanning considerations: the process dwells on each target as long as is needed to determine whether it is a target of interest for tracking or whether it is to be classed as clutter (either static, or moving as in the case of a wind turbine). Discrimination can therefore be done largely on the basis of precision Doppler histories (or the evolution of such histories).

As will become apparent from description that follows, in addition to reducing the requirement for spectrum, particularly in the S Band, the proposed radar network has the potential to provide a number of other benefits including: higher accuracy based on extended measurement baselines and more rapid updates based on the 'staring' (persistently illuminating) sensors; elevation measurement; clutter analysis and removal; target classification capabilities arising from multi-sensor observations, for example based on high-resolution, unambiguous Doppler histories; clutter analysis and removal, including wind turbines; as low-cross-section targets become more prevalent, detection capabilities can be enhanced using appropriate, target-type-specific modelling and filtering.

Such a system also has the potential to offer: imaging capabilities; secondary radar capabilities for messaging including identification and supplemental information.

The holographic radar technology on which the network is based has been successfully demonstrated at trial, is scalable and cost effective. It can therefore meet the performance requirements of current primary surveillance radar and, in a number of respects, can exceed it (especially in relation to clutter suppression, 3D measurements, update rate and added target and track information). Moreover, the cellular nature of the system allows it to be incrementally integrated with, or to incrementally replace, existing air surveillance radar systems.

Moreover, the use of Holographic Radar technology has successfully been demonstrated to maintain performance without degradation in the presence of clutter, particularly including wind farms.

Radar Cell

Figure 2:
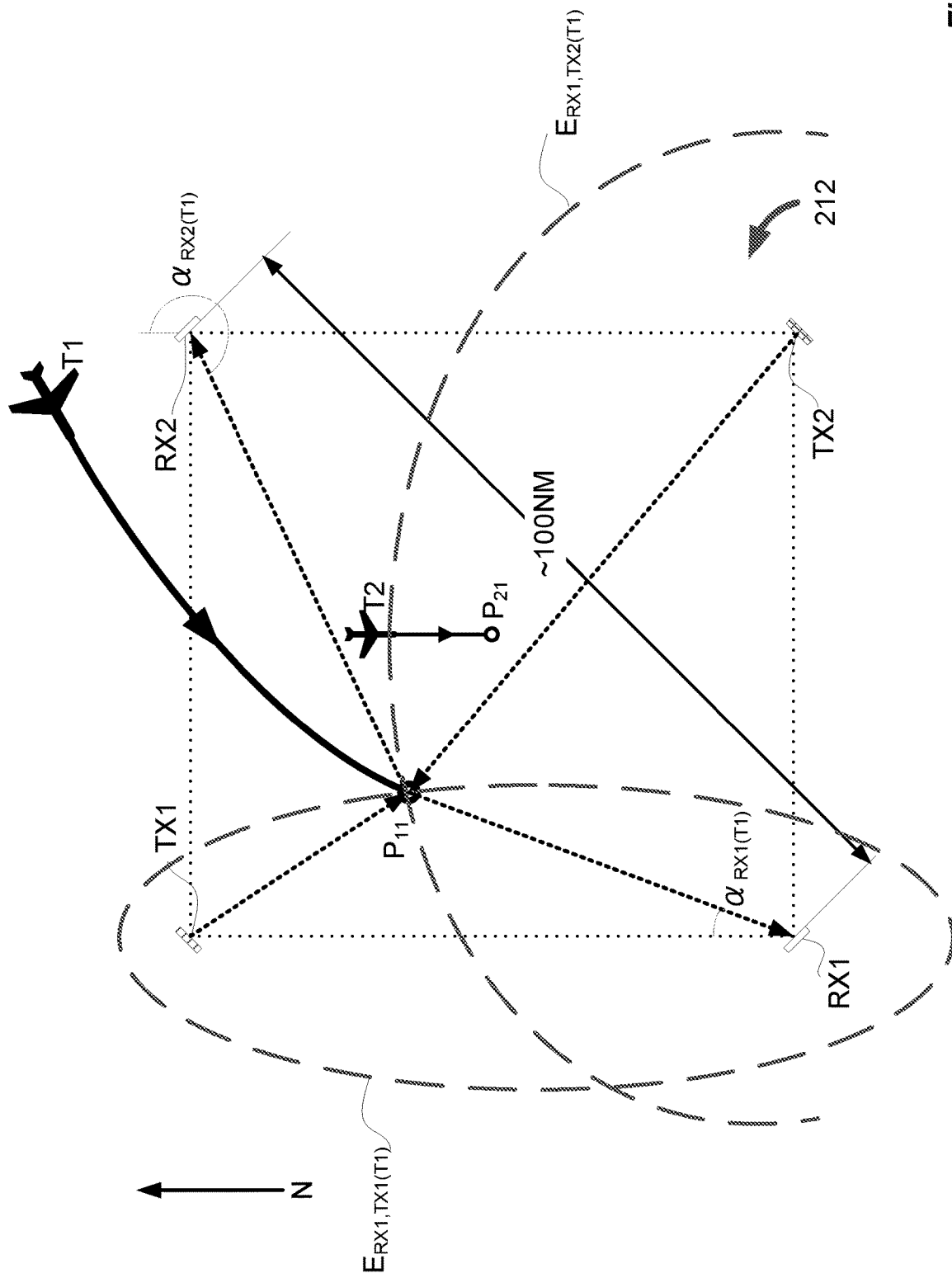
FIG. 2 schematically illustrates, in simplified form, a cell of the radar network of FIG. 1.
Figure 3:
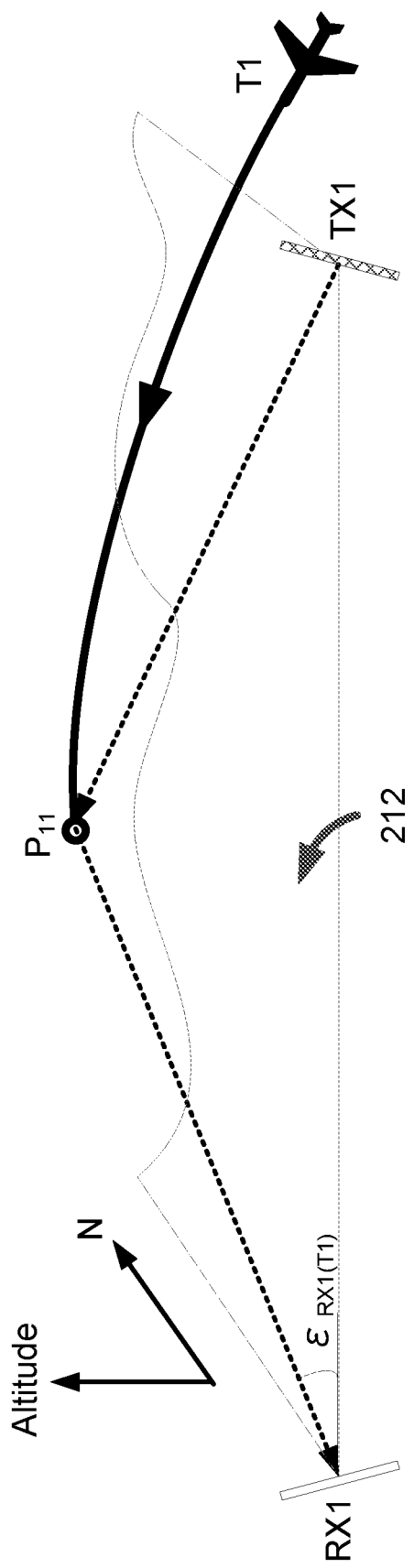
FIG. 3 illustrates, in simplified form, performance of a positional measurement possible in a cell of the radar network of FIG. 1.

A radar cell will now be described in more detail with reference to FIGS. 2 and 3 in which a single cell, suitable for forming part of the radar network 110 of FIG. 1, is shown generally at 212. In FIG. 2, a single square radar cell 212 is shown in plan whilst in FIG. 3, the single square radar cell 212 is shown partially from the side to illustrate a measurement of angular elevation.

The square radar cell 212 formed by two radar transmitters TX1, TX2 arranged at diagonally opposite corners of a square and two receivers RX1, RX2 arranged at the other diagonally opposite corners of the square. The diagonal distance from the transmitter/receiver at one corner of the square to the transmitter/receiver at the other corner of the square is typically, as shown in this example, 100 NM (approximately 70 NM on a side) although larger or smaller cells are possible depending on requirements. Typical useful transmitter to receiver separation may, for example, range from a few tens of meters to tens of kilometres and beyond (e.g. 100 m, 1 km, 10 km or 100 km). The coverage of the cell is configured to extend upwardly to Flight Level 600 (approximately 60,000 feet). The lower limit of coverage is determined by the locations and heights of installation and is, therefore site dependent.

Each radar transmitter TX1, TX2 persistently illuminates a broad region, encompassing the entire square cell 212, with a continuous sequence of pulses of an L band frequency radio wave. When the pulses encounter an object in the illuminated region reflections of that pulse are returned from the object. The pulse repetition frequency (PRF), in this example, is sufficiently high to ensure that the maximum expected velocity (positive or negative) of any target of interest can be determined unambiguously based on the Doppler shift that they impart to the reflected signals that they return. Specifically, the PRF is greater than or equal to four times the expected maximum magnitude of velocity divided by the wavelength of the radio wave used in the pulses.

Each radar receiver RX1, RX2 continuously monitors the radar cell 212 and receives reflections of the pulses returned from targets of interest (for example targets T1 or T2 shown in FIG. 2) such as aircraft, other airborne objects and/or ground or marine based vehicles, from substantially anywhere in a broad region, encompassing the entire square cell 212. Thus, targets T1 and T2 within the cell are illuminated by both radar transmitters TX1, TX2, and their reflections are received by both radar receivers RX1, RX2.

Whilst the radar network is intended to operate with several transmitters 'visible' to each receiver, with each transmitting persistently (continuous sequence of pulses rather than continuous wave), when the distance between the transmitter and receiver is sufficiently large (such as this example) the receivers will not become saturated by line of sight radar signals received directly from a transmitter.

Beneficially, however, where there is a risk of receiver saturation/desensitisation, the radar receivers RX1, RX2 can be configured to attenuate signals received from the direction of each of the transmitters TX1, TX2 to avoid saturating the receiver or degrading its sensitivity undesirably. The attenuation may be achieved mechanically or computationally in any suitable manner for example by shadowing or obscuring the returns, by beam nulling, by appropriate direction of the receiver beam, and/or by signal subtraction.

Furthermore, each radar receiver RX1, RX2 is beneficially able to synchronise with each radar transmitter TX1, TX2 based on the radar signals received directly from that radar transmitter TX1, TX2 (regardless of whether those signals are attenuated or not). It can be seen, therefore, that by partially attenuating (as opposed to completely suppressing) radar signals received directly from the transmitter TX1, TX2 (when necessary), synchronisation with each radar transmitter TX1, TX2 can still can be achieved simply and efficiently based on the radar signals received directly from that radar transmitter TX1, TX2.

As will be described in greater detail later, each radar receiver RX1, RX2 comprises an array of spatially separated receiver elements that are arranged to allow the angular direction from which received reflections of pulses returned from targets of interest to be determined using an associated signal processor. The angular direction can be determined, by the signal processor, both in azimuth, as shown in FIG. 2, and elevation as shown in FIG. 3 (for RX1 and TX1) to provide, for each target detected, a respective pair of measured azimuth angles $\alpha_{RX1}$ and $\alpha_{RX2}$ (one for each of the radar receivers RX1, RX2) and a respective pair of measured elevation angles $\varepsilon_{RX1}$ and $\varepsilon_{RX2}$ (one for each of the radar receivers RX1, RX2) only one of which is illustrated in FIG. 3.

Figure 4:
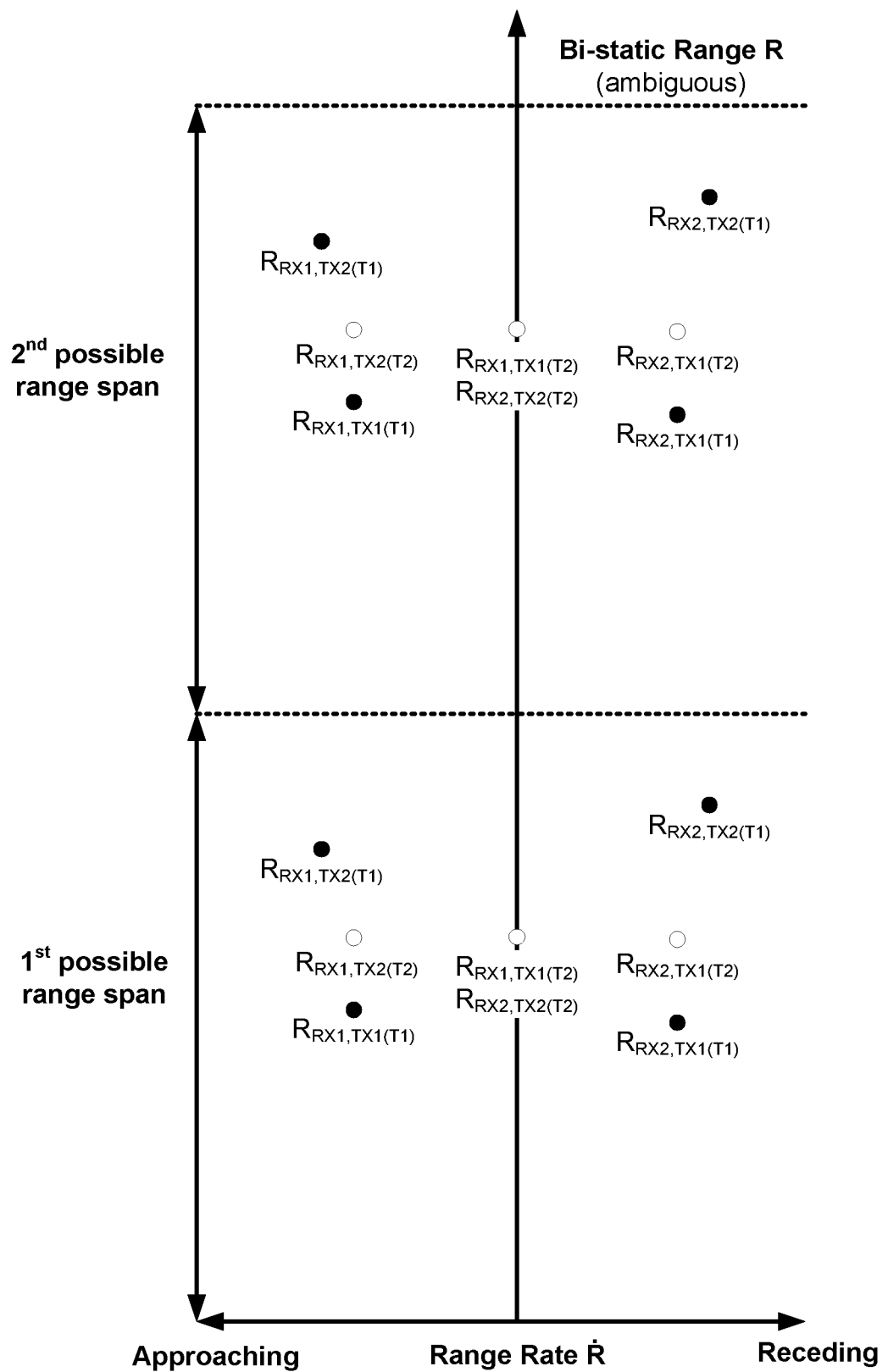
FIG. 4 illustrates, in simplified form, further measurements possible in a cell of the radar network of FIG. 1.

Referring to FIG. 4, which illustrates a bi-static range 'R'/range rate '$\dot{R}$' space in which observations made by the radar receivers RX1, RX2, for the targets T1, T2, are represented, the signal processor of each radar receiver RX1, RX2 is able to determine the velocity vector (speed and direction) of the target from respective measurements of the range rate (positive or negative) of the target in a direction perpendicular to a line between the radar receiver RX1, RX2 making the measurement and each radar transmitter TX1, TX2. The signal processor of each radar receiver RX1, RX2 is also able to determine the combined distance (bi-static range) of a target T1, T2, from that radar receiver RX1, RX2, and from the radar transmitter TX1, TX2 that transmitted the original radar pulse that caused the reflected signal being analysed.

In more detail, the signal processor of each radar receiver RX1, RX2 is able to process the reflected signals received by that radar receiver RX1, RX2 to measure the Doppler shifts imparted to those reflected signals. The signal processor is thus able to determine with a high degree of precision the range rate represented by the measured Doppler shifts, because of the relatively high PRF used by the transmitter. More specifically, for a given target, the signal processor of each radar receiver RX1, RX2 is able to determine a respective pair of range rate measurements; each range rate measurement being associated with signals originating from a respective radar transmitter TX1, TX2. Each range rate measurement represents the velocity of the target in a direction perpendicular to a straight line between the radar receiver RX1, RX2 making the measurement and the radar transmitter TX1, TX2 that transmitted the signals for which the measurements are being made. Thus, the signal processor of each radar receiver RX1, RX2 is able to determine, with a high degree of precision, the 'true' velocity vector (speed and direction) for the target by resolving the pair of range rate measurements (which represent, for the square radar cell 212 of this example, perpendicular components of the true velocity vector).

The velocities calculated at each radar receiver can be internally validated with one another to ensure accuracy.

Doppler spectra and histories are stored, maintained and evaluated for each target, at the receiver and/or the server, and each target is classified (for example as aircraft, helicopter or wind turbine) based on the historical information. Reports are compiled, at the receiver and/or the server, for each reportable target, and in the above examples the responses associated with wind turbines are discarded.

The accurate synchronisation achievable using the direct signals received from the radar transmitters, or by synchronization with precision satellite or terrestrial timing signals, allows the signal processor of each radar receiver RX1, RX2 to determine, with a reasonable degree of accuracy, a time taken (or 'delay'), from a radar pulse being transmitted, to its reflected signal being received at the radar receiver RX1, RX2. The delay represents the combined distance of the target T1, T2, from the radar receiver RX1, RX2 that receives the reflected signal and from the radar transmitter TX1, TX2 that transmitted the original radar pulse that caused the reflected signal (referred to as the bi-static range). A delay measured for a particular target and a particular transmitter TX1, TX2 therefore represents a respective ellipse (or ellipsoid in three dimensions) of constant bi-static range on which the target is located. Each ellipse has a focus corresponding to the radar receiver RX1, RX2 at which the reflected signal is received and another focus at the radar transmitter TX1, TX2 from which the original radar pulse originated. Where synchronization with precision satellite or terrestrial timing signals is used the synchronisation may be made using the so-called 'MSF' or 'The Time from NPL' signal (formerly known as the 'Rugby clock') which currently comprises a, highly accurate, 60 kHz signal broadcast by the UK's National Physics Laboratory (NPL), or may be with any other suitable signal broadcast elsewhere. Synchronisation may be with so-called Coordinated Universal Time (UTC).

In FIG. 2, two ellipses $E_{RX1,TX1(T1)}$, $E_{RX1,TX2(T1)}$ are shown for reflected signals received from target T1 at radar receiver RX1. Each of the two ellipses $E_{RX1,TX1(T1)}$, $E_{RX1,TX2(T1)}$ shown correspond to the bi-static range represented by the delay measured for radar pulses originating from a different respective radar transmitter TX1, TX2. As illustrated, the target T1 to which the ellipses relate is located at an intersection $P_{11}$ between the two ellipses (or ellipsoids in three dimensions). The processing capability of the receiver is able to determine where the ellipses/ellipsoids intersect thereby narrowing down the possible position of the target to a range of possible positions. For most of the cell coverage, the processing capability of the radar receiver RX1, RX2 is able to use the angular measurements (azimuth and/or elevation) to find the point of intersection between the ellipses/ellipsoids that is consistent with the angular measurements thereby providing a true measure of the position, P11, of the target.

The measured delay, and hence the associated bi-static range represented by the timing, is inherently ambiguous because of the relatively high PRF required to ensure that Doppler (and hence velocity) can be determined unambiguously, and because of the relatively large geographic area that the radar cell 212 covers. This can result, for a given target, in several possible bi-static range aliases (which can be visualised as a plurality of confocal ellipses of different sizes). In FIG. 4 this ambiguity of the range measurements is illustrated as a plurality of possible range 'spans' each including the actual observation of a target at the true bi-static range or an alias of it. For most of the cell coverage, however, the angular measurements (azimuth and/or elevation) can be used to eliminate aliases to arrive at a true measure of the position, P11, of the target.

Depending on the configuration of the radar transmitter/receiver and the cell size and shape, it is possible that a target may occasionally be in a position in which positional ambiguity still exists, or in which true position cannot be determined with sufficient precision, using a single radar receiver RX1, RX2, alone. Beneficially, however, in such 'pathological' cases the positional measurements provided by the other radar receiver RX1, RX2, can be used to resolve any remaining positional ambiguity and/or to refine the positional measurements thereby allowing the target to be positioned accurately using trilateration. Even where positional information can be determined to a required level of precision using a single radar receiver RX1, RX2, alone, the positional measurements provided by the other radar receiver RX1, RX2, can be used, advantageously, to refine the positional measurements further to provide improved precision and/or to provide a fall-back check of positional accuracy.

It will be appreciated that the respective angular (azimuth and elevation) information derived by the different radar receivers can also be used to identify a positional measurement for a target, relatively precisely, without the need for range measurements, because the geometry of the radar cell is known.

Moreover, in some exceptional cases of high symmetry, for example when a target located exactly in the centre of the radar cell 212, travelling due South (as shown for target T2 at position $P_{21}$), the transmitter pulses will overlap in range. In the case of T2 at $P_{21}$ for example, all the bi-static ranges will be the same, and Doppler for RX1→TX1 and RX2→TX2 will be zero. It might appear that such, exceptional, situations will cause interference making it more difficult for the radar receivers RX1, RX2 to resolve the signals and determine the required positional/movement information. Even in such exceptional cases, however, whilst the transmitter pulses will overlap in range, the different Doppler effects exhibited by the pulses received at each receiver (RX1←TX1(zero) compared to RX1←TX2 (approaching) and RX2←TX2 (zero) compared to RX2←TX1(receding)) can be used resolve them from one another.

As seen in FIG. 4, therefore, for a particular target T1, T2 there are four possible measurements of bi-static range within a given range span (two for each receiver) and four possible measurements of range rate (two measurements for each receiver—one for each perpendicular component of the velocity vector).

In summary of the measurements for each target are illustrated, for clarity, in Tables 1 and 2 below.

TABLE 1

Target T1 (heading SSW, top-left of cell)

| RX | TX | Range | Range Rate | | Azimuth | Elevation |
|---|---|---|---|---|---|---|
| RX1 | TX1 | $R_{RX1, TX1 (T1)}$ | $\dot{R}_{RX1, TX1(T1)}$ | → approaching | $\alpha_{RX1(T1)}$ | $\varepsilon_{RX1(T1)}$ |
|  | TX2 | $R2_{RX2, TX2 (T1)}$ | $\dot{R}_{RX1, TX2(T1)}$ | → approaching | | |
| RX2 | TX1 | $R_{RX1, TX1 (T1)}$ | $\dot{R}_{RX2, TX1(T1)}$ | → receding | $\alpha_{RX2(T1)}$ | $\varepsilon_{RX2(T1)}$ |
|  | TX2 | $R2_{RX2, TX2 (T1)}$ | $\dot{R}_{RX2, TX2(T1)}$ | → receding | | |

TABLE 2

Target T2 (heading S, centre of cell)

| RX | TX | Range | Range Rate | | Azimuth | Elevation |
|---|---|---|---|---|---|---|
| RX1 | TX1 | $R_{RX1, TX1 (T2)}=$ | $\dot{R}_{RX1, TX1(T1)}$ | → zero | $\alpha_{RX1(T1)}$ | $\varepsilon_{RX1(T1)}$ |
|  | TX2 | $R_{RX1, TX2 (T2)}=$ | $\dot{R}_{RX1, TX2(T1)}$ | → approaching | | |
| RX2 | TX1 | $R_{RX2, TX1 (T2)},=$ | $\dot{R}_{RX2, TX1(T1)}$ | → receding | $\alpha_{RX2(T2)} =$ | $\varepsilon_{RX1(T2)} =$ |
|  | TX2 | $R2_{RX2, TX2 (T2)}$ | $\dot{R}_{RX2, TX2(T1)}$ | → zero | $\alpha_{RX1(T2)+180°}$ | $\varepsilon_{RX2(T2)}$ |

Doppler spectra and histories are evaluated for each target, and the targets are classified—for example as aircraft, helicopter or wind turbine.

Reports are compiled for each reportable target, and in this case the wind turbines are discarded.

Radar Receiver

A radar receiver suitable for use in a radar cell will now be described in more detail, by way of example only, with reference to FIGS. 5(a) and 5(b).

In summary, each radar receiver consists of a planar receiving array and associated computing and communications equipment. The array consists of a number of rows and columns of radio-frequency receiving elements arranged, in this example, for L band functionality. These together continuously acquire coherent signals scattered from targets and clutter within the field of view, which are passed in digital form to a Sensor Data Processor. Generally, the receiving array is arranged to point upwardly (e.g. at approximately 45 degrees).

Figure 5B:
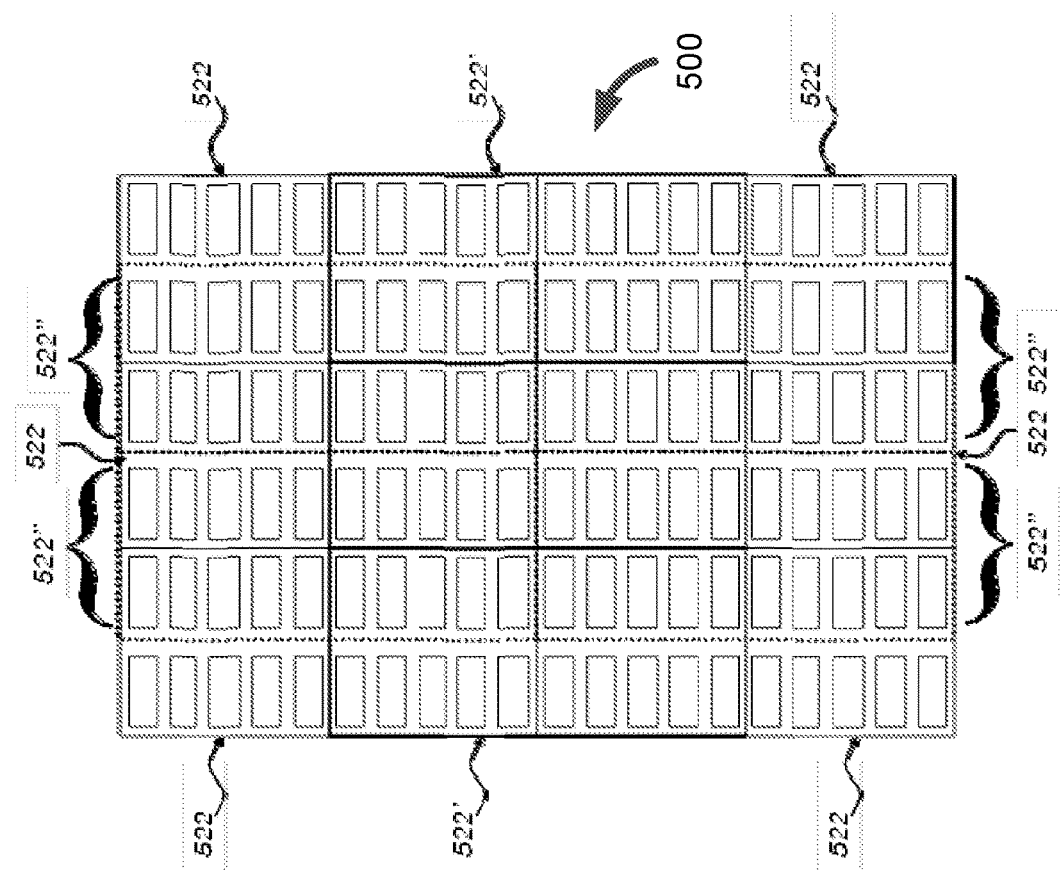
FIG. 5 illustrates, in simplified form, a radar receiver suitable for use in a cell of the radar network of FIG. 1.
Figure 5A:
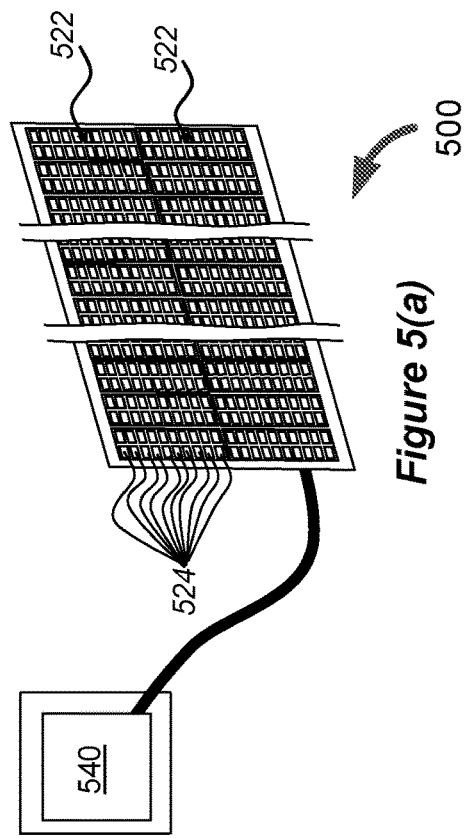

FIG. 5(a) illustrates a radar receiver generally at 500. The radar receiver 500 comprises a receiving array comprising a plurality of receiving sub-arrays 522. Each sub-array 522 comprises a plurality of receiving elements 524 configured over an area. Each element 524 and sub-array 522 of the receiving array is arranged to receive signals returned from substantially the whole of the illuminated volume, each element 524 and/or sub-array 522 essentially forming a signal channel.

Each receiver sub-array 522, in the exemplary receiver 500, is ten receiving elements 524 high by two wide arranged to have substantially the same aperture size as the transmitter array. The sub-arrays are arranged in a grid which is two sub-arrays high by eighty wide.

As seen in FIG. 5(b) the elements of the sub-arrays 522 are also configured to form further, overlapping sub-arrays 522', 522" (or 'virtual' sub-arrays) as illustrated in simplified array of sub-arrays (two high by three wide).

The elements of vertically adjacent sub-arrays are configured to form vertically overlapping sub-arrays 522'. Specifically, the lower five elements in each of the two columns forming each upper sub-array, and the upper five elements in each of the two columns forming each lower sub-array, form a vertically overlapping sub-array 522' which shares some receiving elements with both the associated upper and lower sub-arrays.

The elements of horizontally adjacent sub-arrays are similarly configured to form horizontally overlapping sub-arrays 522". Specifically, for each pair of horizontally adjacent sub-arrays, the elements of the rightmost column of the left sub-array, and the elements of the leftmost column of the right sub-array, form a horizontally overlapping sub-array 522" which shares some receiving elements with both the sub-arrays of the associated horizontally adjacent pair.

In the case of the receiver array shown, therefore, the receiving elements 524 and sub-arrays 522 are arranged in a spaced relationship, facing substantially the same direction, to form an overall aperture comprising eighty-two non-coincident, but overlapping sub-apertures in width and three non-coincident, but overlapping sub-apertures in height.

It will be appreciated that although specific array and sub-array dimensions are described, any appropriate arrangement of sub-arrays and receiving/transmitting elements may be used depending on the requirements of the application for which they are used. This includes, for example, arrangements having different sub-aperture overlaps (or no overlaps), different aperture dimensions, arrays which are wider than they are tall etc.

Whilst the receiving array (and sub-arrays 522) shown are planar, it will be appreciated that they may be conformal to some other known shape. The arrays or sub-arrays may for example be non-coplanar. The arrays may, for example, be formed on the angled faces of a pyramidal structure, or on a curved, concave or convex structure.

The radar receiver 500 comprises a signal processing module 540 (such as a computer processor or the like) configured such that signals which are coherent with the transmitted signal may be introduced and used to determine the amplitude, frequency, delay and phase of all signals received at each element or sub-array. The processor module is also configured for the formation of multiple beams digitally by combination of different signal channels with suitable amplitude and phase weightings. The processing module 540 is configured for performing the signal processing tasks required by the application for which the radar receiver is to be used, for example, beamforming, range gating, Doppler processing, low threshold detection, target tracking (e.g. XYZ, Vxyz, A/Phi(m, n, t)), imaging and/or classification.

The arrangement of sub-arrays 522 and receiving elements 524 allows multiple (overlapping) beams to be formed (e.g. one for each of the different sub-arrays 522), digitally by the processor, which have substantially the same look direction, thereby permitting monopulse sub-beam angular measurement. The use of a plurality of sub-arrays 522 permits greater measurement accuracy than phase monopulse angular measurement using, for example, a single array of closely spaced receiver elements.

It will be appreciated that although phase monopulse angular measurement is described, the receiver elements and/or receiver sub-arrays may be arranged to allow amplitude monopulse angular measurement.

It will be further appreciated that a plurality of sub-arrays may also be arranged having different look directions, effectively creating a plurality of separate apertures/sub-apertures. The sub-arrays may be arranged, for example, to provide a wider (for example 360°) coverage. Similarly, the sub-arrays may be arranged to look at a known man made or other obstacle from (slightly) different locations thereby allowing targets which would otherwise be obscured by the obstacle to be resolved with greater accuracy. If, for example, the radar receiver is located at a wind farm the receiver sub-arrays may be arranged to 'look around' turbines which otherwise obscure part of their individual fields of view.

Thus, whilst beamforming on transmission is a process with a single, physically-exclusive outcome, on reception as many beams can be formed as the configuration of the receiver array and the available processing resources can support. Hence, whereas transmission beams must be directed sequentially, receiving beams may be formed simultaneously.

In this way the signals from all targets are fully sampled, information loss is minimised, and Doppler alias effects are avoided, resulting in the ability to: perform precision tracking and coherent tracking; reconstruct imagery; characterize behaviour; classify targets etc. Tracked targets are represented in computer memory not only in terms of XYZ and Vxyz as a function of time, but also in terms of the Doppler phase and amplitude history of the target.

Signals received by the subarrays may simultaneously be combined in a first data stream such that the amplitude and phase weightings provide a null in the direction of the land or sea surface, to reject surface targets, and in a second data stream such that the amplitude and phase weightings provide a null in the direction of raised objects such as wind turbines, allowing the observation of surface targets and rejection of turbines or aircraft. Separate filtering and tracking algorithms can then be applied to the two or more data streams.

The received return signals effectively represent observations (which may or may not represent a target of interest) made by the radar receiver in each of a plurality of signal channels. In the radar receiver, data extracted by the processor for each observation is stored in process 'pixels'. Each pixel may be considered to be a unique set of numbers representing, for example, a single combination of time, range, range rate and/or Doppler frequency, and at least one of beam number, sub-array number, and/or element number.

The pixel content comprises a list of numbers representing, for example, a series of amplitudes, phases and/or frequencies representing the characteristics of the associated observation, which may constitute a target, an item of clutter, or a 'null', whose behaviour may be deemed insignificant. Observations are deemed significant until they are reliably known to be insignificant and a history of the information (e.g. phase histories, amplitude histories, or the like) extracted from the observations is retained. This approach contrasts with the process of thresholding in which observations are deemed insignificant and discarded, without further processing, unless a particular parameter (or set of parameters) meets an associated threshold (or set of thresholds).

In a cluttered environment typified by a wind farm, therefore, the radar receiver functions to form the best tracks possible for all targets, based on amplitude and phase histories, and to discriminate between significant and insignificant targets (or targets representing one class or another) at the end of the analysis rather than at the beginning. Coherent analytical processes can be applied to enhance or minimize targets of different types, since all signal information is retained within the signal and target memories.

Thus, the configuration of the radar receiver is such that it is capable of accommodating and discriminating targets and clutter in a densely populated environment.

The receiver channels are processed and digitally converted separately, and after pre-filtering provide a high channel dynamic range of over 95 dB and a beam/Doppler dynamic range of over 140 dB. Deep RF filtering reduces susceptibility to interference or jamming.

The receiver is subject to regular automatic self-calibration, providing excellent angular accuracy and performance monitoring.

The receiver obtains target information in greater depth than a sequentially-scanning Primary Surveillance Radar. For each target it generates range, azimuth, elevation, and Doppler spectra at approximately 4 Hz. The output can be adapted to existing surveillance processing and display systems that require a slower rate.

It will be appreciated that the configuration (size, spacing and number) of the elements in the receiver array and/or any sub-arrays may be changed in dependence on requirement.

Radar Transmitter

A radar transmitter suitable for use in a radar cell will now be described in more detail, by way of example only, with reference to FIG. 6.

In summary the radar transmitter illuminates the same volume of airspace as is observed by the sensor, with a pulse modulated waveform and a precisely-defined spectrum. Like the receiver, the transmitter is also generally arranged pointing upwardly (e.g. at approximately 45 degrees).

In operation, the transmitter emits a continuous (or quasi-continuous) signal, centred at the required frequency, and modulated to occupy the minimum bandwidth (typically a single 2 MHz band) to support range resolution requirements. The bandwidth, in this example, is based on a range resolution requirement of approximately 150 m which has the potential to deliver positional accuracy of better than 50 metres.

As seen in FIG. 6, the transmitter comprises at least one array 610 of transmitting elements 614 configured to illuminate a whole volume of interest simultaneously, with a coherent signal modulated appropriately (for example as a regular sequence of pulses) to permit range resolution. It will be appreciated that although an array of elements is described the transmitter may comprise a single transmitting element.

As seen in FIG. 6 the transmitter array, in this example, is ten transmitting elements 614 high by two wide and therefore comprises fewer elements than the receiver array and has a substantially smaller total aperture.

The radar transmitter is provided with a control module 650 configured for controlling the signals transmitted via the transmitter array 610 in dependence on the requirements of the radar cell for which the radar transmitter is to be used.

It will be appreciated that the configuration (size, spacing and number) of the elements in the transmitter array may be changed in dependence on requirement. In some situations a single transmitter element may be sufficient.

Benefits

In its essence, the cellular approach provides for an array of transmitting and receiving holographic elements, positioned for broad surveillance coverage. This can be described as an active multi-static holographic radar array or 'Polygraphic Radar Network' (or 'PGRN'). The cellular approach allows an incremental roll-out, integrated with other surveillance radar sensors, and leading to a single integrated radar network over time.

It can be seen, therefore, that the proposed arrangement provides the ability to determine the target's position and motion with great accuracy in 3 dimensions. It exploits the joint coverage provided by the different sensor and transmitter pairs, which greatly adds to the capability of any single sensor.

The combination of transmitter/receiver pairs described above allows the target to be positioned using combinations of angular and distance measurements. The arrangement provides also provides 'redundant' position and movement measurements that can be used to improve the precision of the positioning and/or velocity vector measurements.

Whilst it might appear that there is a risk that the different transmitters will set up a deep interference pattern that will make detection unpredictable or ineffective in certain locations (e.g. in situations of extreme symmetry), a target's response will contain separate Doppler components for each transmitter which allow the different signals to be resolved and meaningful material obtained. Moreover, the scattering of each pulse from one transmitter, at the target, will be independent of the scattering of each pulse from the other transmitter (because the scattering emanates from a different point of the target's structure). The precision Doppler process will therefore allow separation of the components, and the bi-static ranges will also generally differ for the two transmissions.

In addition to reduced spectrum occupancy, there are several additional benefits of the cellular approach, including:

The ability to operate transmitters continuously without desensitising the receivers. Continuous transmission of a waveform with a suitable bandwidth minimizes peak transmission power requirements. The intensity of direct reception from transmitter to receiver is reduced and brought within the receiver's dynamic range because of the bi-static separation and because of opportunities to screen transmitters from receivers and to null out received signals in the transmitter direction. In a monostatic radar this is not normally practicable. Modulated CW signals are used that can be compressed in duration by suitable FIR filters.

Exploitation of large baselines, providing angular accuracy

The quantity and precision of data acquired for each target (leading to precision, target classification, and the potential for reduced aircraft separation)

Smoothing of detection probabilities and measurement accuracy over the broad area within the cell Different transmitters and receivers will observe the target from different directions, thus reducing the likelihood of drop-outs in detection.

As emphasised above, the radar receivers acquire all the signals (within their operating frequency range) scattered by targets within a persistently-illuminated, 3-dimensional field of view of a static transmitter and do not, therefore, observe a narrowly-defined direction but instead form many beams over the volume, and therefore the receiver beneficially does not 'lose sight' of targets but instead has an indefinite time-on-target (while the target is in view). This maximises the opportunity to distinguish targets' behaviour.

The acquisition of precise, extended signal histories from each target, allows optimal target detection, classification and tracking in a 3-dimensional airspace.

Whilst multi-static radar can, potentially, operate passively using transmissions from third-party sources (and this can appear attractive since it effectively provides an additional function without, in principle, requiring the occupation of any additional radio spectrum) the cellular network described uses an active system with dedicated radio transmitters. The use of an 'active transmission' approach in which dedicated radio transmitters are used is advantageous because it allows the actual waveform, spectrum and beam patterns to be designed explicitly to meet the surveillance requirement. Moreover, it allows the derivation of accurate Doppler transforms using the received signals to be greatly simplified because the transmitted waveform is precise, fully coherent and tightly controlled in that respect. Further, third-party sources controlling transmissions of opportunity will be beyond the direct control of the Air Navigation Service Provider (ANSP), and therefore will require extensive planning, agreements and precautionary measures to provide assurance. The active transmission approach avoids such complexities by using signals that are under the control of the ANSP, but using a minimum bandwidth that remains available and affordable.

The network cells can be configured to support the provision of Air Traffic Services both inside and outside controlled airspace, to detect intruders and infringements into controlled airspace, including, due to its 3-dimensional capability, infringement from lower levels than previously possible without significant additional complexity.

The combined cell operating band offers a functional benefit in that the extended baselines can be exploited in the coherent target processing. Positioning is ultimately based on multilateration. In each cell, each single target will be represented in the processing space by more than one detection; this requires additional computational power to resolve multiple targets within the cell; however the long baselines this provides allows high 3D positional precision, while the high coherence supports 3D vector plots (that is, position and instantaneous velocity).

The network has the potential to provide positional accuracy in the region of 50 m rms or less, in addition to the direct measurement of direction and speed of travel. Elevation measurement accuracy will be similar at higher altitudes. This level of accuracy beneficially supports the maintenance of minimum separation standards between aircraft, and has the potential to support greater exploitation of vertical separation.

As regards aviation safety, the radar cell architecture offers a fundamentally robust approach to surveillance, as part of the Safety Management System, and one that will support appropriate safety casing. The radar receivers provide redundancy, both by redundant cover of the airspace, and by means of explicit redundancy provisions within the radar equipment. A high level of redundancy is also provided at the level of receiver channels, internal communications, timing and waveform control, processing hardware, radar transmission and data transmission.

The cellular radar network's use of radar technology which 'stares' persistently into a persistently illuminated volume allows significant clutter mitigation, especially that caused by moving wind turbines, although other forms of clutter can also be greatly attenuated because of their combination of position and motion or other behaviour. Such clutter includes clutter caused by road vehicles, clouds and weather, etc. Static clutter may also be eliminated via these processes.

The use of transmitter signals around the network as a source of synchronisation has the potential to allow a very low level of drift and jitter around the system.

Further Features

Enhanced/Alternative Disambiguation

Whilst one technique for the resolution of delay related bi-static range ambiguity, based on angular (azimuth/elevation) measurements, has been described above, it will be appreciated that such ambiguity resolution may be enhanced or replaced by use of appropriate transmitter encoding (e.g. phase and/or chirp encoding).

Specifically, using both Doppler and 'envelope' range rates determined in the course of one or more sample frames, a degree of range ambiguity can be resolved by means of pulse coding and range/Doppler processing. By the same method, and with appropriate pulse to pulse phase coding, both range and Doppler ambiguities can be resolved at the same time. The phase coding applied in this example is applied between pulses, rather than within a pulse, and is thus very different to 'phase coding' as applied in pulse compression techniques.

Examples of phase encoding are illustrated in FIGS. 7(a) and 7(b) in which the transmitter imparts a known coding sequence of phase shifts to the radio signals in the transmitter pulses.

The phase shift has the effect of modulating the Doppler shift measured by the receiver (and hence the range rate measurements) by a significant but known amount. The receiver can determine an estimate of actual range rate for a target based on consecutive delay measurements and is therefore able to identify for which of a selection of possible ambiguous ranges the modulated Doppler shift is consistent with that range rate estimate.

The minimum phase coding for a sequence of pulses involves transmitting two pulses at the same phase, separated by a Pulse Repetition Interval ('PRI'—equal to the reciprocal of the PRF), followed by two successive pulses of inverted phase, also exactly at the PRI.

An example of this is shown in FIG. 7(a) which shows a simple coding sequence of two pulses with no phase shift followed by two pulses with a 180° (pi radians) shift which is repeated indefinitely.

Accordingly, a target detected at a range between once and twice the unambiguous range, and with a Doppler shift of $F_{dop}$ will appear to have acquired an additional Doppler shift equal to the positive or negative Nyquist frequency (PRF/2).

Thus, by computing the target's radial range rate from the change in measured range in successive, effectively continuous, data frames or subframes, rather than from the Doppler value, the choice between $V_r$ and $V_r$ +/− PRF/2 can be made unambiguously.

Similarly, a true range rate above the unambiguous limit of $V_{rmax}=[c \times PRF/(4 \times F_{op})]$ will appear at an apparent Doppler frequency of $F_{dop}$ +/− PRF (note that this is different from the error occurring from range ambiguity).

Further, using a similar method, a target having both ambiguous range ($R_{max}<R>2 \times R_{max}$) and ambiguous Doppler ($F_{dop}>$PRF/2) will appear at $V_r$ +/− PRF, +/− PRF/2. Thus, for effectively continuous target signal information, the correct values of R and $V_r$ can be computed based on data from successive frames or subframes, either with direct range comparisons or by cross-correlation of the pulse envelopes.

Longer and more complex pulse code sequences may also be used that are capable of extending the capability for range disambiguation. These involve phase code sequences based on successive phase shifts of 90 degrees or 45 degrees, with sequences of 8, 16, or more pulses. Whilst this requires finer distinction between true and ambiguous ranges and Doppler frequencies, the available precision of Doppler values will be sufficient to meet this requirement.

For example, in FIG. 7(b) a more complex coding sequence is illustrated in which the successive phase shifts increase by 90 degrees ($\pi/2$ radians).

The coding sequence of FIG. 7(a) is particularly effective because it only relies on the receiver being able to determine the direction of movement of the target (the 180° phase shift will effectively invert the modulated range rate). However, due to its frequent repetition, the simple coding scheme does not provide as wide a range of unambiguous coverage as the more complex coding scheme of FIG. 7(b).

FIG. 7(c) shows a range/range-rate surface that illustrates the effect of the phase coding of FIG. 7(b) on Doppler measured range rate for target T1 in FIG. 2. In this example, T1 is assumed to be in the second bi-static range span for radar return signals originating from transmitter TX2 and hence returns from TX1 are not represented for clarity. As seen in FIG. 7(c). Target T1, relative to RX1 is approaching the RX1, TX1 line and therefore has a true range rate value that is approaching as illustrated by the point $D_{RX1,TX2(T1)}$. However, because the target is in the second range span, as a result of the phase coding the Doppler, the target appears to be receding at $D'_{RX1,TX2(T1)}$. Similarly, Target T2, relative to RX2 is receding from the RX2, TX1 line and therefore has a true range rate value that is receding as illustrated by the point $D_{RX2,TX2(T1)}$. However, because the target is in the second range span, as a result of the phase coding the Doppler, the target appears to be approaching at $D'_{RX2,TX2(T1)}$.

Nevertheless, because an estimated value of range rate can be determined by reference to successive range measurements it is relatively straightforward to use this to determine whether the phase coding has resulted in this pre-determined shift in Doppler frequency and consequently resolve which range span the target is actually in and what the exact Doppler value is by removing the known phase coding.

Continuous Coherent Radar Network: Target Reconciliation and Trilateration

In prior art scanning surveillance radar systems, a target illuminated by one scanning radar could appear as false targets to another radar that operates using the same frequency.

Contrastingly, in the radar network 11, the separate transmitters TX1, TX2 and receivers RX1, RX2 in the radar network 11 are static, persistently illuminate a desired volume with a series of pulses, and operate on the same frequency and coherently. The transmitters TX1, TX2 can operate either with substantially zero, or fixed phase or delay shifting between them (and/or other members of the network). The transmitters TX1, TX2 can also operate with small or slow intentional phase or delay modulation between them to aid in identification of radar return signals processed by the different transmitter/receiver pairs (for example, RX1-TX1, RX1-TX2, RX2-TX1, RX2-TX2).

Regardless of whether the transmitters operate with a phase delay between them or not, the returns received at each of the receivers RX1, RX2, from each of the different transmitters TX1, TX2, can, advantageously, be reconciled without false targets causing an issue.

Specifically, because the transmission timing of each transmitter TX1, TX2 and its respective location relative each receiver RX1, RX2, is known (at the processor of the receiver and/or at a central processing capability), valuable target information can be acquired for each pairing of transmitters TX1, TX2 and receivers RX1, RX2 that are not possible in more conventional systems. For example, the apparent ambiguities arising from the fact that radar returns originating from one transmitter TX1, TX2 appears, on receipt, to be substantially identical to those from another transmitter TX1, TX2 (by virtue of the common frequency use by different network elements) can be resolved. In one exemplary system, this is beneficially achieved by computing apparent target positions based on the known azimuth and elevation angles for each receiver, and the known transmitter locations and timing.

The radar returns from any single target will be received at a particular receiver at the same azimuth and elevation directions regardless of the transmitter TX1, TX2 from which the signals originated. Thus, only detections arising from returns received at the same angle may require reconciliation. Once a target is detected, its position with respect to a first receiver/transmitter pair, comprising the known receiver RX1, RX2 of the returns from that target and a selected transmitter TX1, TX2 (which may be selected arbitrarily) is hypothesised. This hypothetical position can be determined from the azimuth and elevation angle for that detection in combination with the relative location of the receiver and transmitter of that receiver/transmitter pair. For a cell 112 containing two transmitters TX1, TX2 (e.g. as illustrated in FIG. 2), this detection will be accompanied by a second detection, originating from the other of the two transmitters TX1, TX2, for the same receiver RX1, RX2. If the first positional hypothesis is correct (because the correct transmitter was selected), then the second detection will have an associated hypothetical position that is consistent with the known location and synchronisation of the second transmitter, and the hypothesised position within the radar cell 112 of the target causing the second detection, will be the same as for the first detection. If the hypothetical positions are found to be consistent, then the position of the target can be refined by combining the associated pair of bistatic range measurements in a form of bistatic trilateration which, at longer bistatic ranges, can be more accurate than measurement based on angular measurement by the receiver.

If, on the other hand, the two hypothetical position measurements are not mutually consistent, then the initial (possibly arbitrary) transmitter assignment is reversed, and positions recalculated and then refined if necessary.

Figure 8B:
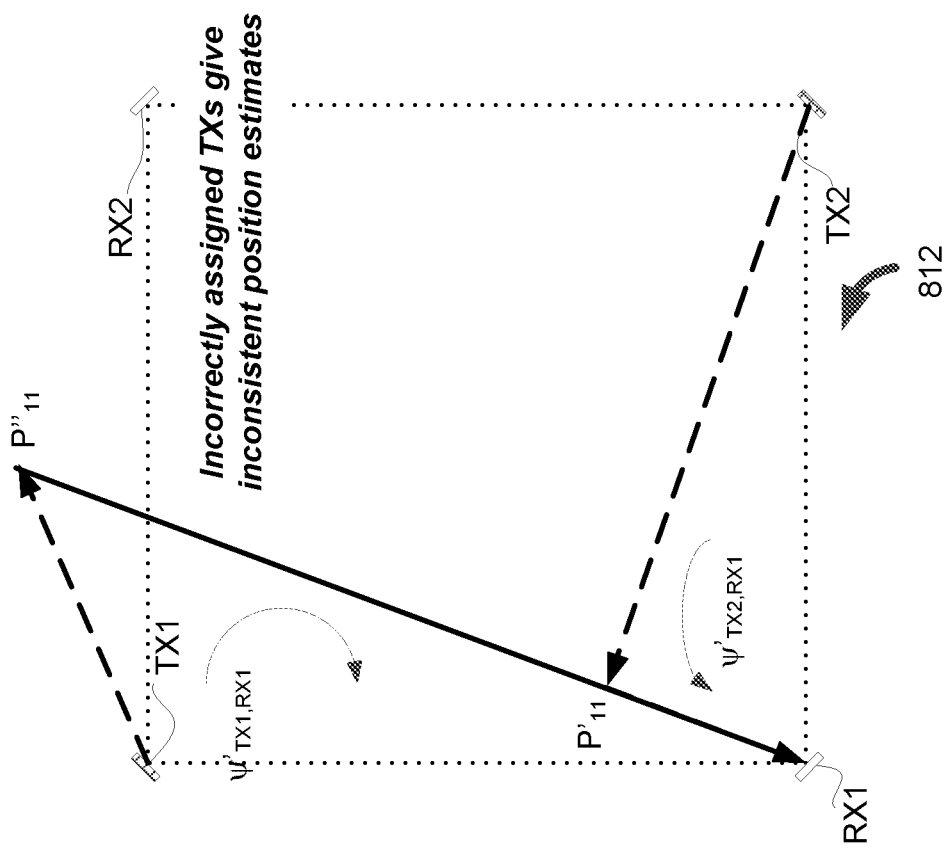
FIGS. 8(a) and 8(b) illustrate, in simplified form, reconciliation of detections from different transmitters in the radar cell of FIG. 2.
Figure 8A:
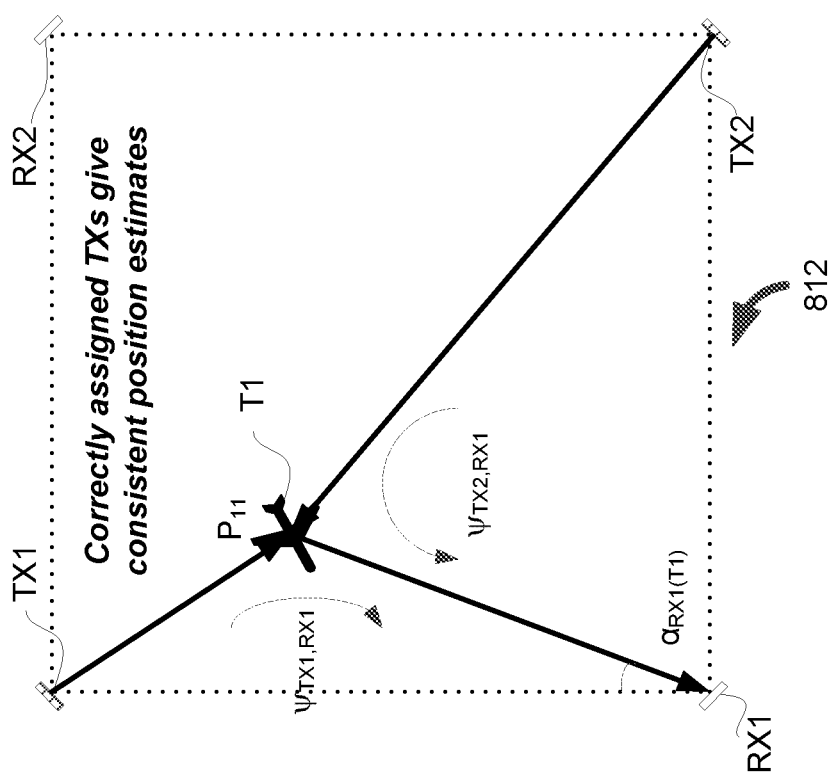
Figure 9:
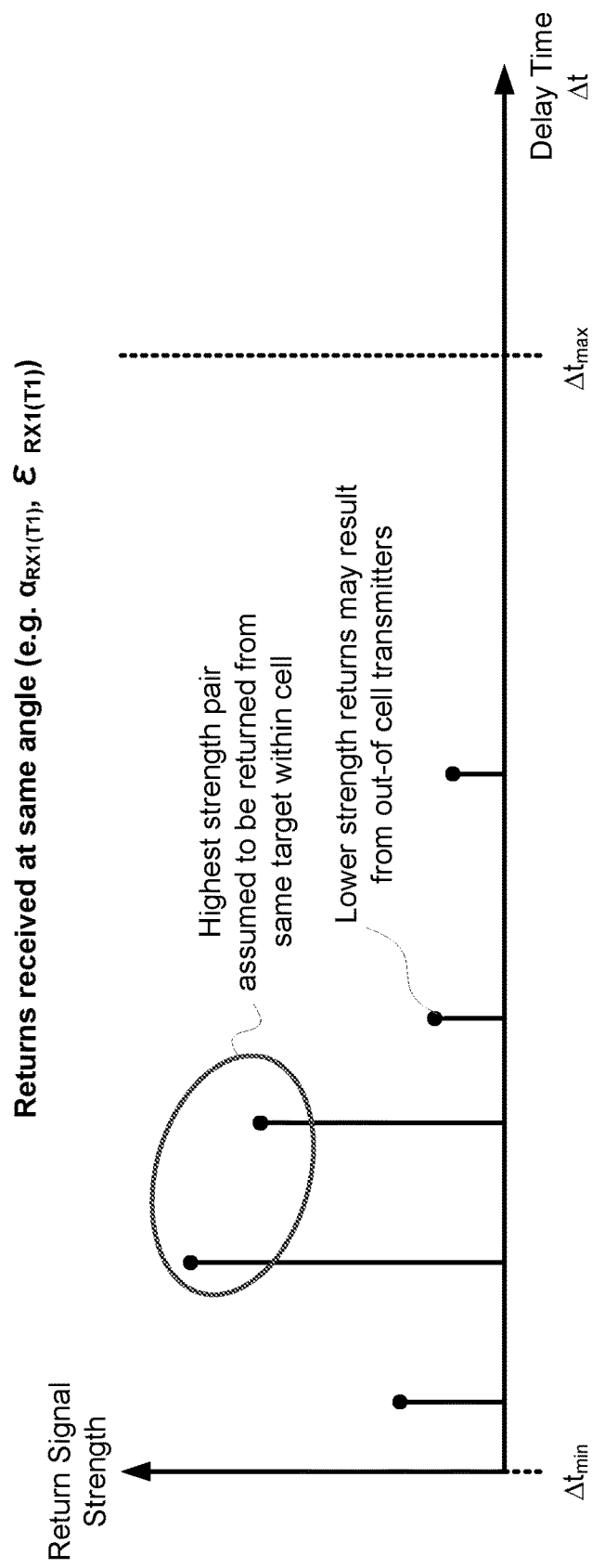
FIG. 9 illustrates, in simplified form, selection of return signals for reconciliation as illustrated in FIGS. 8(a) and 8(b)
Figure 10:
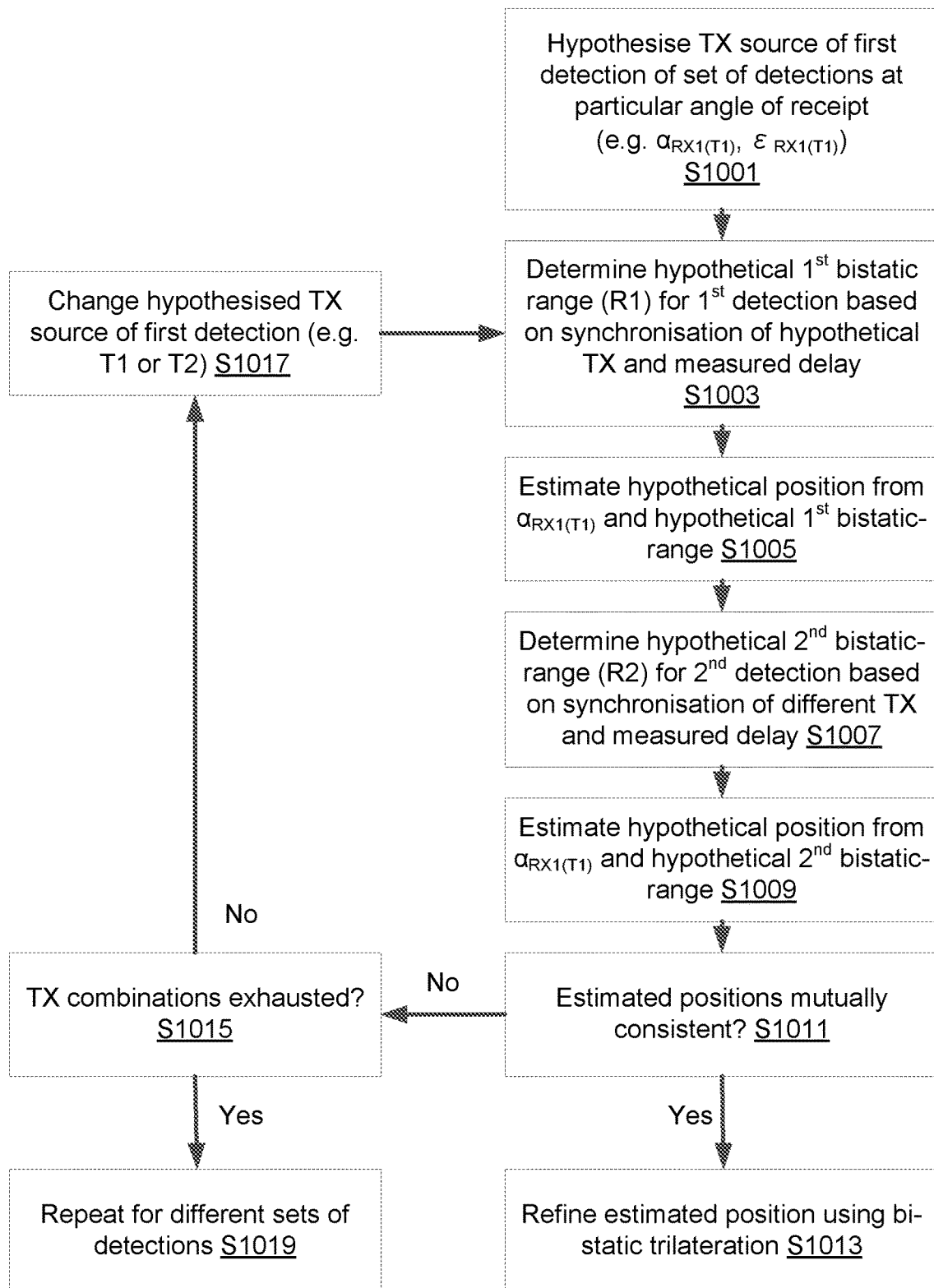
FIG. 10 illustrates, in simplified form, a flow chart illustrating a process for reconciliation of detections from different transmitters as illustrated in FIGS. 8(a) and 8(b)

FIGS. 8 to 10 illustrate the process of detection reconciliation, in more detail, with reference to a radar cell 812 similar to that shown in FIG. 2.

FIG. 8(a) illustrates a radar cell 812 in which radar returns originating from each transmitter TX1, TX2 are reflected from target T1, via respective paths $\psi_{TX1,RX1}$ and $\psi_{TX2,RX1}$ and received at receiver RX1. The return signals are received at an azimuth angle $\alpha_{RX1(T1)}$ relative to a straight line between transmitter TX1 and receiver RX1 and at an elevation angle $\varepsilon_{RX1(T1)}$ relative to the plane of the radar cell 812.

When the target T1 is detected and the correct transmitters are selected for each detection, then the position derived from the known azimuth and elevation angles for the receiver RX1, and the known transmitter locations and timing are consistent with one another and, hence, the position $P_{11}$ of the detected target.

FIG. 8(b) illustrates the radar cell 812 of FIG. 8(b) in the case where the different detections are associated incorrectly with the wrong transmitters TX1, TX2. As seen in FIG. 8(b), in this situation, the respective hypothetical positions of the target $P'_{11}$, $P''_{11}$, derived for each detection from the known azimuth and elevation angles for the receiver, and the known transmitter locations and timing, are inconsistent with one another, with the boundary of the cell 812 and, hence, with the actual target position. Thus, it is relatively straightforward to dismiss such positions as being erroneous.

FIG. 9 illustrates the selection of detections for reconciliation. As seen in FIG. 9, when the radar cell 812 forms part of a wider radar network, radar returns may be received from the same target, at the same azimuth and elevation, that originate from transmitters of other radar cells. Accordingly, there may be detections arising from radar return signals originating both from within the radar cell 812 and detections arising from radar return signals originating from outside the boundaries of the radar cell 812 In this case, the return signals originating from transmitters TX1, TX2 of the radar cell 812 associated with the receiver RX1 that receives the signals will generally be the highest strength signals and thus, the set of detections associated with the highest power return signals can be selected for reconciliation. If the respective hypothetical positions associated with each detection arising from the highest magnitude return signals cannot be reconciled for either transmitter TX1, TX2, then, because the raw data is retained, reconciliation can be attempted with other combinations of detections.

FIG. 10 is a flow chart illustrating, by way of example only, one method by which detections from different transmitter sources TX1, TX2 can be reconciled.

Initially, when a number of radar return signals are all received at a particular receiver RX1, RX2 from a common azimuth and elevation angle, and an associated target is detected, there is a respective detection associated with radar signals originating from each transmitter TX1, TX2 in the radar cell 812 and possibly a number of other detections associated with radar return signals arising outside the radar cell 812. A set detections (typically one for each transmitter) are selected (for example those associated with the highest power return signals as described above). A respective transmitter source associated with each of the detections is then hypothesised at S1001.

A first hypothetical bi-static range R1 is then determined, at S1003, for a first of the detections based on the known synchronisation of the hypothetical transmitter source associated with that detection and the delay, relative to their hypothetical transmission time, at which the radar return signals for that detection are received. From this, and the known azimuth and elevation angles of the detection, a first hypothetical position of the detected target can be estimated at S1005.

A second hypothetical bi-static range R2 is then determined, at S1007, for a second of the detections based on the known synchronisation of the hypothetical transmitter source associated with that detection and the delay, relative to their hypothetical transmission time, at which the radar return signals for that detection are received. From this, and the known azimuth and elevation angles of the detection, a second hypothetical position of the detected target can be estimated at S1009.

If, at S1011, the first and second hypothetical positions are consistent with one another (e.g. they place the detected target at a substantially identical position within a predetermined margin of error) then they the detections are presumed to be associated with the correct transmitters and the position estimate is refined at S1013 (e.g. using trilateration).

If, at S1011, the first and second hypothetical positions are not consistent with one another then they the detections are presumed to be associated with incorrect transmitters and, if another transmitter combination is still possible at S1015, the reconciliation process repeats for another transmitter combination.

The procedure repeats until either all possible transmitter combinations have been exhausted without success at S1015, or the correct transmitter combination has been found. It will be appreciated that, whilst there are only two possible combinations in this example, there may be more possible combinations where there are more than two transmission sources from which the detections could have arisen.

If all possible transmitter combinations have been exhausted without success at S1015 then reconciliation can be attempted with a different set of detections (e.g. including one or more detections associated with lower power radar return signals than those used for the previous reconciliation attempt).

This approach can provide significant benefits in terms of a very substantial reduction in the bandwidth requirements for the whole surveillance system, as described above. It also results in improved positional measurements by trilateration, and in diverse Doppler measurements that can: reduce or mask the effects of target fading that occurs for each signal path but that will not be directly correlated between signal paths thereby improving probability and continuity of detection; and contribute to the system's ability to form coherent images of the target.

Such consistency checking can be extended to multiple (greater than two) transmitters, with an associated increase in computing burden, but added positional certainty and fading-resistance for the resolved results.

In this way, therefore, multiple simultaneous detections can be used in the sense of additional supporting information for each target, rather than treated in terms of interference.

Target Centric Acquisition and Processing (TCAP)

Current surveillance radar technology is generally dominated by either mechanically or electronically-scanned receiver arrays. Thus the 'time-on-target' is strictly limited by the scanning process. In the case of mechanical scanning time-on-target is determined by the width of the receiver beam and the rate at which the receiver array is rotated. In the case of electronic scanning, the 'time-on-target' is effectively determined by a software-defined resource management system which interleaves tracking functions with surveillance scanning. Thus, in electronically scanned systems, surveillance and continuity are compromised by tracking.

As described above, each radar cell of the radar network is designed so that it acquires effectively continuous target signals, without a limit constrained by the radar system's scan process or imposed by a resource management system. This allows raw radar return data (and processed or partially processed return data) to be retained, uninterrupted, and reused following initial detection and subsequent analysis of a target.

Beneficially, this allows the duration of the processing interval during which return signals from a target are continuously processed (the effective 'time-on-target') to be set arbitrarily and extended, indefinitely (until a target disappears), to support more detailed target analysis.

Thus, the duration of the effective processing interval used for making an initial detection may be set based on a specified speed of acquisition and then another, different, duration processing interval used, post detection, for more detailed analysis of a detected target, for example based on a detected target characteristic (e.g. a motion characteristic) or classification. For example, a relatively short initial processing interval may be used, and then, following detection, the processing interval may, in effect, be extended to allow for more detailed target analysis.

The longer the processing interval the greater the 'processing gain' in terms of signal-to-noise ratio and the higher the resolution of frequency domain processing. Thus, TCAP can provide significant improvements in the signal-to-noise ratio and/or provide higher resolution in the frequency domain depending on requirements.

Moreover, frequency domain processing is directly related to the motion of the target, whose measurement is therefore further enhanced by extending the processing interval to increase the period of signal continuity and exploiting the resulting improvements in frequency domain resolution.

Figure 11:
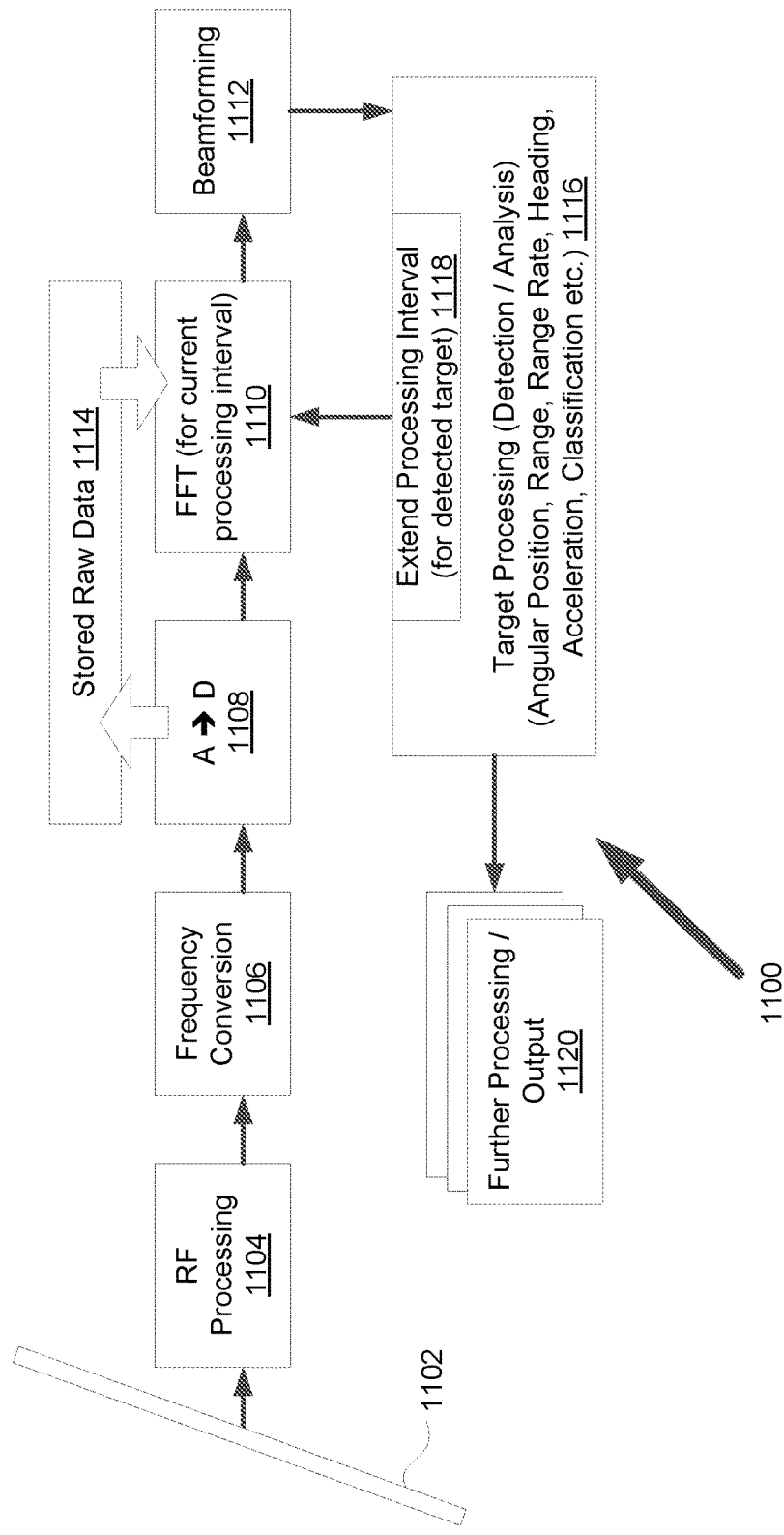
FIG. 11 is a simplified functional block diagram of an exemplary radar receiver suitable for use in a cell of the radar network of FIG. 1.

In FIG. 11 a simplified functional block diagram of circuit modules/signal processing modules (which may comprise hardware, software or a mix of hardware and software) suitable for implementing a receiver signal processor for the radar network 110 is shown generally at 1100. In this example signals are received by the receiver elements of a receiver array 1102. The signals received by the receiver array 1102 receive preliminary radio frequency (RF) processing by an RF processing module 1104 prior being transformed in frequency to an intermediate frequency by an IF generation module 1106. The analogue outputs of the IF module 1106 are converted to digital outputs by an analogue to digital (A-D) converter module 1108. Raw digital radar return data is stored in an appropriate data store 1114.

Complex FFTs are then carried out on the outputs of the A-D converter module 1108 (and/or the stored raw data) by an FFT module 1110, prior to beam formation at a beam-forming module 1112 (although it will be appreciated that beamforming may be carried out in the time domain prior to FFT). The time domain to frequency domain conversion performed by the FFT module is completed for an appropriate initial processing interval (for example 2 ms).

The digital beamformer 1112 forms multiple beams substantially concurrently (for example, one for each element or group of elements), in the desired directions, from the outputs of the A-D converter module 1108 using appropriate phase and/or amplitude weightings. It will be appreciated that although a digital beamforming module is described the beams may also be formed prior to analogue to digital conversion at the RF or IF stage using appropriate analogue beamforming circuitry, for example circuitry comprising phase modulators.

The beam outputs from the beam former 1112 are then subject to various forms of signal processing to support the detection and tracking of targets.

A target processing module 1116 is configured to detect any targets. This may be achieved in any suitable way, for example by forming migration surfaces (e.g. a range/range rate surface) for each beam and then detecting any target(s) in one or more of the migration surfaces.

The target processing module 1116 is configured to analyse the detected target to determine for example inter alia to determine an angular position (in azimuth and elevation), a range, a range rate, a heading, an acceleration, a classification etc. for the target. The angular position of each detected target may, for example, be determined using amplitude monopulse comparison between beams and/or phase monopulse comparison between elements of the receiver. The use of phase monopulse can be advantageous over the use of amplitude monopulse because it is easier to calibrate for the type of receiver arrays described here, being an element-oriented single parameter, rather than a beam-oriented 2-D plot. Phase monopulse measurements are also generally more accurate than amplitude monopulse measurements.

If the target processing module 1116 determines the target to be of sufficient interest based on the target analysis (which may occur after the target analysis described above is only partially performed) then the target processing module 1116 may determine that more detail is required. If this is the case, then the processing interval is extended (by processing interval extension sub-module 1118) for the detected target and the time domain to frequency domain processing repeated, by the FFT module 1110, for the extended processing interval and beamforming repeated by the beamforming module 1112 (if required).

Further processing of the acquired target information and/or output of information relating to the target to an operator may be performed by one or more further processing/output modules 1120. This may occur substantially simultaneously or in parallel with any process interval extension and associated re-processing thereby allowing the most refined (i.e. the most up-to-date and hence the most precise) target information to be provided to the end user.

Accordingly, it can be seen that surveillance is persistent, or 'always on', while tracking and target analysis are achieved by continuing the coherent acquisition and analysis of target signals. Advantageously, a non-threatening target can be assigned a position and tracked, while an anomalous or otherwise threatening targets can be continually enhanced by extending the effective processing interval, potentially indefinitely or until the target disappears from view.

Thus, not only are all parts of the field of view interrogated simultaneously, but target processing using the full complex history of signal amplitudes and phases can be extended, indefinitely, as needed, for example when more detailed target information is required.

Extended Coherence

Dynamic motion (acceleration and higher order movement such as 'yank' and 'jerk') of a target tends to limit, and can defeat the benefit of, coherent integration. However, the inertia of the target means that such dynamic motion has a finite effect that may be bounded by the nature of the target and determined by the behaviour of the target.

In existing systems coherent integration for a target can only be extended as long as the radar scan dwells on the target, whereas in the radar network described above, since transmitter dwell time is not limited (except by the target exiting), coherent processing can be pursued to meet the detection and analysis requirements for the target.

In addition to extending the processing interval, therefore, a particularly advantageous example of a radar cell or network, as described above, is provided with the ability to effectively extend the coherence of the system to allow third (and possibly) higher order effects to be determined reliably.

Specifically, the 'extended coherence' feature provides either: for the pre-distortion of the phase of a received radar return signal according to a pre-determined, multi-branched set of phase/time shifts, or: for the concatenation of successive, contiguous but multi-branched, complex, extended Fourier transforms (that is, concatenated from a 'tree' of adjacent or neighbouring frequency 'bins' of shorter dwell) to resolve trajectories that exhibit one of a set of rates of radial acceleration. Each of these variations will be described in more detail below with respective reference to FIGS. 12 and 13.

A predetermined dynamic model of each of various target types is used to construct a series of branched filters, which can be applied either to a Fourier transformation of the signal, or to its time domain representation, to determine which branch most closely represents the actual target motion.

Having determined the type, the speed and the branch, the filter output can be used to form an extended complex Doppler history of the target. Combinations of branches can also be used in classification.

Figure 12:
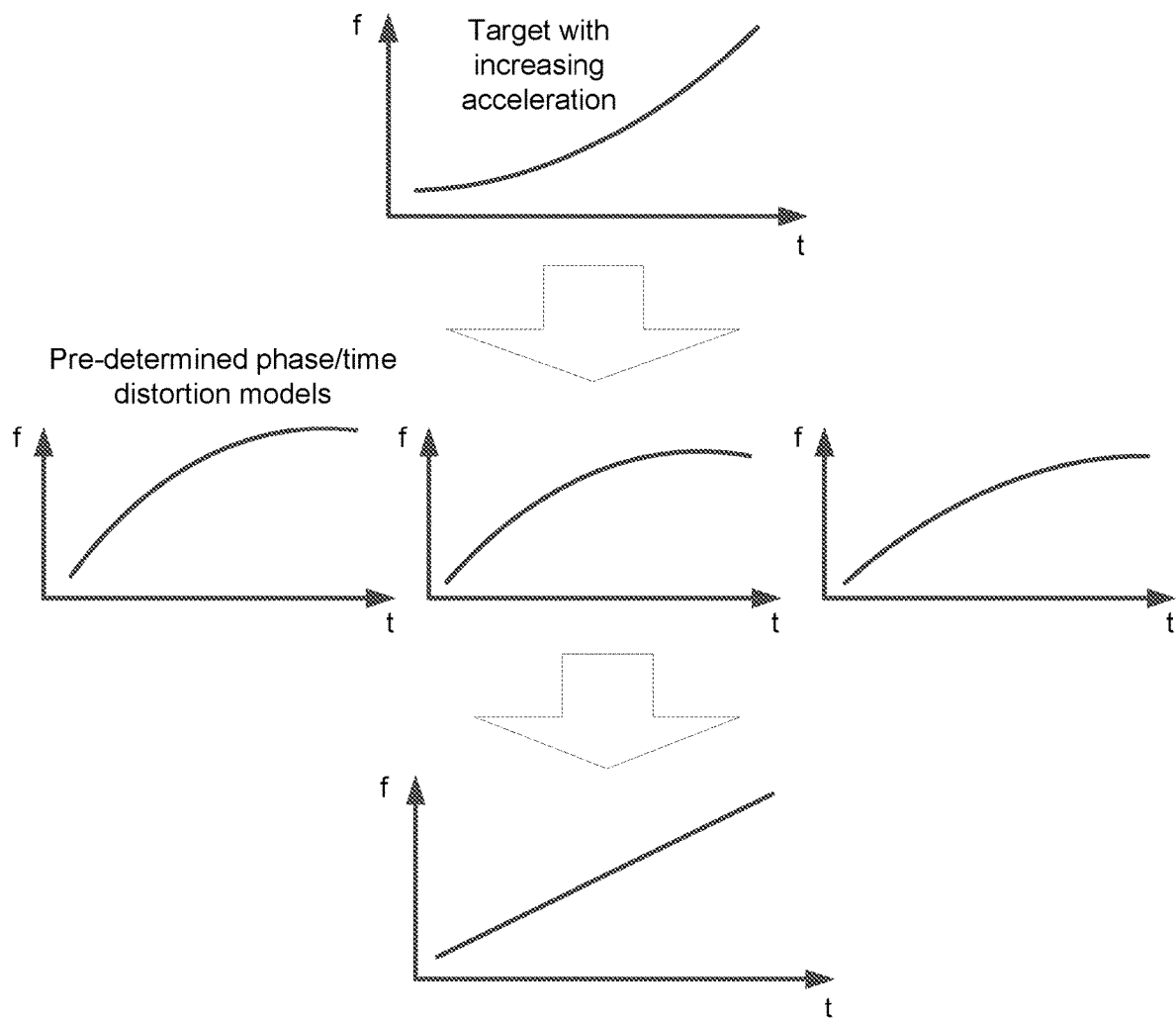
FIG. 12 illustrates, in simplified form, a technique for extending coherence in the radar network of FIG. 1.

FIG. 12 illustrates a process in which the phase of a return signal is pre-distorted for a target with acceleration increasing, in this example, at a constant rate. As seen in FIG. 12 the pre-distortion involves applying a pre-determined dynamic model representing a series of phase/time shifts, selected from a multi-branched set of phase/time shifts, to the radar return signals in the time domain to distort the received signals into a form for which FFT processing is more suitable (a linear—constant acceleration—frequency-time characteristic in FIG. 12).

The branch of the multi-branched set of phase/time shifts which is found to provide the most suitable distortion is the branch that most closely represents the actual target motion and can therefore be used to identify and to detect certain types of pre-characterised target behaviour types. Where a particular set of phase/time shifts (branch) provides a good fit for a certain time period, the model may be extended by concatenating a different set of phase/time shifts (branch) for a subsequent time period.

This is particularly advantageous because an FFT is significantly more efficient if the result is a constant range rate (single frequency) and so a target exhibiting a 'constant acceleration' (second order) can be determined between subsequent FFTs. Variable acceleration (third order) can then be accommodated by finding the best mean acceleration and then branching the set of distortion phase/time shifts, based on the rate of acceleration (jerk).

Figure 13:
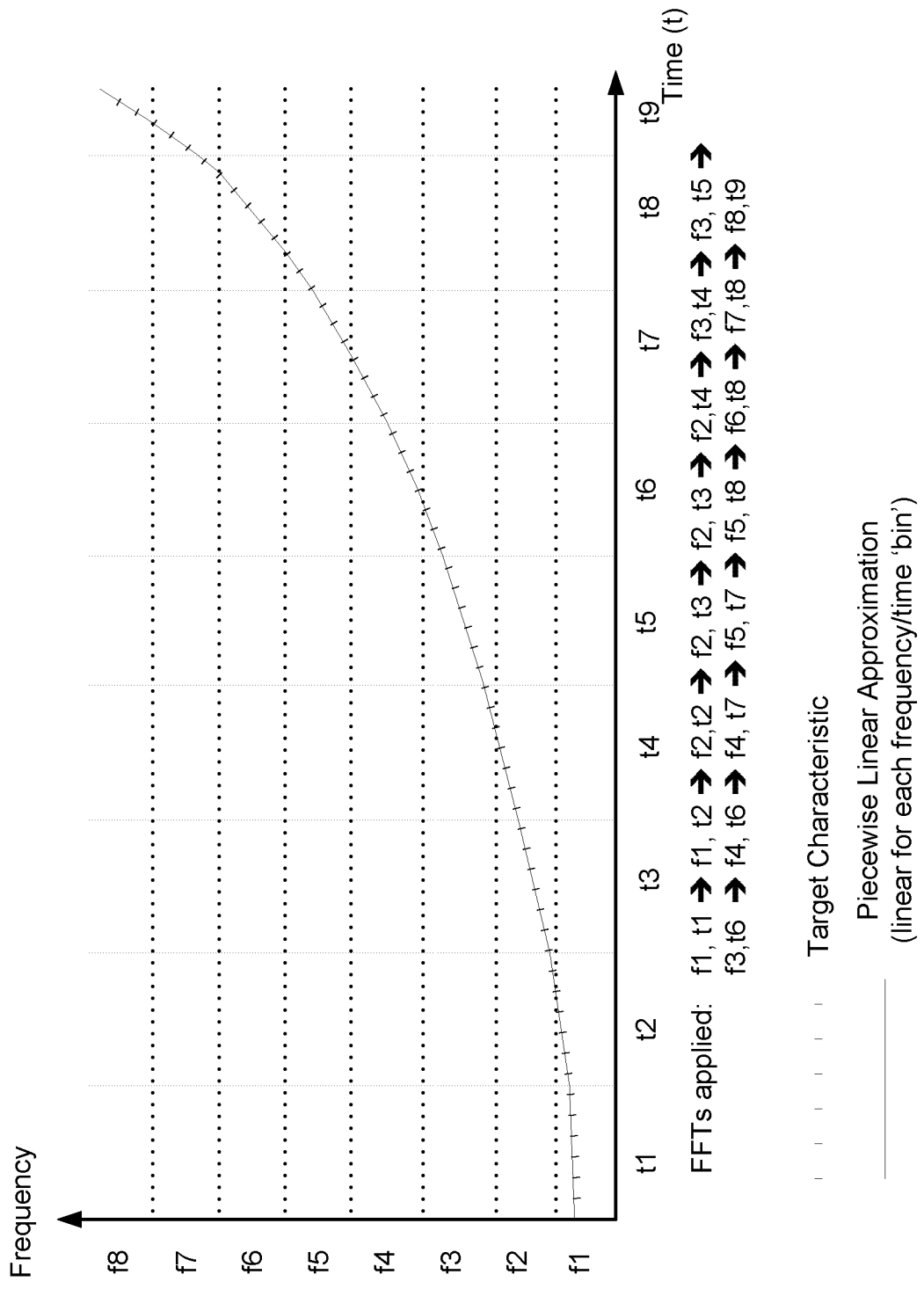
FIG. 13 illustrates, in simplified form, another technique for extending coherence in the radar network of FIG. 1.

FIG. 13 is a frequency time graph for an example in which a target exhibits increasing range rate. In the example of FIG. 13, FFT processing is significantly simplified by concatenating a series of complex FFTs for each of a number of frequency 'bins' (of relatively short dwell time) that are contiguous (adjacent in frequency, or neighbouring in time). The FFTs are concatenated to give a concatenated FFT for which coherence is maintained. In effect, this process provides a concatenated FFT representing a piecewise linear approximation to the frequency time characteristic. This concatenated FFT can then be filtered using a predetermined multi-branched frequency domain model to determine which branch most closely represents the actual target motion.

Adaptive Extended Coherence

As described above, the time on target may be adapted, post-detection, for a particular target or a specific class of targets (for example, those within a particular geographical area). Similarly, since data acquisition for a target is, in fact, continuous as long as it remains within the field of view, the period over which radar return signals are coherently integrated may be extended, indefinitely, following a detection, to allow improved measurement of attributes such as acceleration, 'jerk' and 'yank', to form images, or to aid in identifying behaviour such as aerobatics or aberrant piloted control of aircraft, or failures in control systems of unmanned air systems.

Where a particular branch of a particular dynamic model has been determined to most closely represent target behaviour this may be adapted, for example following extension of the period of coherent integration, by adaptively re-applying branches of the dynamic model until an improved fit is found and/or by concatenating a different series of branches.

Thus, complex histories can be extended by Fourier-based analysis of concatenated data frames, establishing characteristic trajectories, or sequences of trajectory perturbations, and depending on and adapting to observed target behaviour over time.

Accordingly, coherent integration can constrained or extended, essentially at will, in accordance with target measurements and/or analysis.

Doppler Spectrum Filtering for Extended Time Periods

Radar that is required to detect aircraft in the presence of sources of radar interference having moving parts ('moving clutter') such as wind turbines can have to deal with radar returns which exhibit a significantly higher signal energy than radar returns from aircraft (this is especially true for turbines).

A number of techniques may be applied in a radar cell/network as described above in order to discriminate between radar returns from such sources of radar interference and radar returns from targets of interest.

One technique for providing such discrimination is to compare the evolution of Doppler frequency over time for detected targets. Using such a technique, targets such as wind turbines, for example, can be identified and discriminated against by virtue of the characteristic evolution of the Doppler spectrum associated with rotation of the turbine blade over time. Such a technique is only possible in a radar system that utilises the persistence provided by radars that apply holographic principles, as described herein, because the target is illuminated continuously and therefore sufficiently high resolution Doppler is produced.

The techniques for detecting an aircraft in a cluttered environment, and in particular a cluttered environment comprising wind turbines, can be enhanced by taking further account of the fact that the Doppler spectra of returns from aircraft and wind turbines are fundamentally different in character, for example:

Aircraft produce a sharp peak in the Doppler spectrum and the frequency of this peak changes steadily over time, depending on the direction and acceleration of the aircraft;

Wind turbines produce a distributed spectrum, the level and frequency distribution of which changes substantially from one observation period to the next.

Beneficially, therefore, in order to enhance the detection of aircraft over wind turbines, the following processing steps are utilised where appropriate:

Median filtering is applied to the Doppler spectrum.

This involves replacing each point in the Doppler spectrum with a median average of a number of points on either side, prior to subtraction and thresholding. This is effective in suppressing the distributed background from the wind turbines without suppressing the sharp peak from the aircraft. If threshold detection is subsequently applied, this considerably enhances the probability of the peak from an aircraft exceeding the threshold with respect to the probability of a turbine exceeding the threshold.

Utilisation of past observations.

This involves filtering the Doppler spectrum over time for current and past observation periods such that steadily changing peaks are enhanced whereas rapidly changing spectra, such as that associated with wind turbines, is suppressed. Thus, before a peak is accepted as being from an aircraft, account is effectively taken of the frequency of peaks from earlier observations to confirm that the peak is associated with a target of interest.

Wide Area Micro-Doppler

Micro-Doppler refers to Doppler associated with changes in phase arising from such small movements of a target that the range change does not extend for more than half the wavelength of the radar signal. Typically, for example, vibrations of a target, and/or or fast rotating parts of a target, will cause micro-Doppler associated phase modulation of a radar return signal that can manifest itself as sidebands around the 'macro' Doppler frequency associated with bulk motion of the target.

Beneficially, the ability to extend the effective dwell time or time-on-target ('processing interval') indefinitely and the coherent integration of signals, by virtue of the persistent illumination and observation of a volume of interest without interruption, allows the sidebands associated with micro-Doppler effects to be identified and analysed.

Thus, another feature of the radar cell/network is the ability to resolve phase deviations, or 'micro-Doppler', arising from sub-wavelength radial and/or vibratory motions, rather than in the sense of a Doppler 'frequency' where the motion is assumed to progress steadily over multiple carrier wavelengths. Since this can be applied over the full broad field of view of a radar receiver, this is termed, herein as 'wide area micro-Doppler' which was not previously possible.

The ability to derive such micro-Doppler effects opens up the possibility of many additional applications and/or enhanced target classification (e.g. based on target vibrations and or rotary part detection). For example, micro-Doppler models may be developed for targets of different types and/or 'threat' levels (e.g. based on vibratory signatures for different engine types—such as, propeller, jet, rocket etc. — and/or configurations—such as twin engine, single prop etc.). These micro-Doppler models may thus be used to further enhance target classification.

Secondary or Vernier Beamforming

Another beneficial feature of the radar cell/network described herein is the storage of raw radar return data (pre or post FFT) following beamforming. Hence, a target detection can be used to initiate the re-formation of one or more beams that are more optimally-directed for the purposes of determining accurate azimuth and/or elevation directions (e.g. based on phase and/or amplitude monopulse measurements), to optimise signal to noise ratios and to further improve range measurement.

Beneficially, beams may be re-formed not by a Fourier inverse process but by explicit complex weightings of contributing antenna elements.

Sidelobe Suppression

Another beneficial feature of the radar cell/network described herein arises from the fact that, during the extended dwell time or 'time-on-target' of the radar, all beams are formed substantially simultaneously in the computing domain. Accordingly, while sidelobes exist, the sidelobes and any associated detections that may arise from the sidelobes, exist in direct time correlation with the main beams and their detections.

Detection and processing occur within a large four-dimensional range/azimuth/elevation/Doppler space, of which Doppler has the finest 'grain', and it is possible to identify main- and side-lobe detections appropriately. Accordingly, detections associated with side-lobes can either be suppressed completely or, because the detections are known to be associated with the sidelobes, the detections may be used to enhance target positional analysis, for example based on the relative signal strength (signal amplitude) of the detections in each sidelobe.

The precise correlation in range and Doppler of targets detectable in neighbouring beams, that arises as a result of persistent illumination and interrogation of each target, can be used to obtain a unique angular position. Contrastingly, in a conventional radar target detections in neighbouring beams cannot be so correlated.

As an example, a wind turbine blade generates a radar return that varies rapidly through a steep peak or flash. This flash will not be synchronised with the rotation used by a typical scanning radar, and during the scan it is not therefore possible to determine whether, at the time of the flash, the receiver main beam or a sidelobe was illuminated. This is especially significant where the intensity of the flash is high compared with the minimum sensitivity of the radar. By contrast, with the holographic networked radar, the flash is observable simultaneously and in precise correlation between the main beam and sidelobes. This allows the position to be determined uniquely.

Multipath Discrimination

In surveillance radar systems, such as the radar network described herein, a backscatter echo is used to determine the location of targets both in range and direction (azimuth and elevation). In an ideal situation a single direct radar return echoed from the target will enable the radar receiver signal processor to generate a unique detection report for each individual target.

In reality, however, the backscatter from a target can reach the receiver via two or more paths—the so called 'multipath' phenomenon. For airborne targets, for example, multipath can result from the reflection of radar returns from the ground, the surrounding terrain and or other items of clutter.

The multipath phenomenon can 'deceive' a radar processor into detecting non-existent or 'ghost' targets. Standard radar processing for filtering out false alarms is generally not particularly good at suppressing ghost targets because they move in a similar manner as a normal target (because the radar returns that cause them originate from a real target). A partial solution for mitigating multipath ghost targets is to incorporate a ground map of the radar surroundings and to eliminate all echoes which appear to originate below ground. However, such an approach does not deal with 'above ground' ghost targets that are offset in azimuth from the true target.

The radar receivers of the radar network described herein are beneficially able to eliminate ghost targets arising from multipath effects by taking advantage of the continuous, uninterrupted illumination and observation of the volume of interest provided in the radar network. Thus, the radar receivers are able to generate uninterrupted continuous observations of targets present anywhere within the radar footprint. This allows the radar return processors to characterise the detection history of an observed target, over an extended dwell time (effective 'time on target'). Ghost targets detections arising from multipath effects will have characteristics that are strongly correlated with the detection arising from the direct target echo with the ghost target, in general, being time delayed and spatially offset with respect to the true target. Once again, as with in-sidelobe detections, the 'ghost' target is not decorrelated from the real target by any scanning motion of the receiver.

The approach for eliminating such multipath ghost targets is analogous to the sidelobe suppression technique described above.

Detection of a target and the associated processing occurs within a large four-dimensional range/azimuth/elevation/Doppler space, of which Doppler has the finest 'grain'. Direct and multipath detections are identified through observing the time evaluation of different target related attributes. Using data association and correlation based on reported range, Doppler and angular direction related targets are associated with one another and hence a true target will be linked with any corresponding ghost detections.

Doppler consistency of each target can be respectively checked against the measured range rate for that target and its motion profile to allow a genuine target to be identified and distinguished from multipath ghost detections. The multipath detection approach described herein is advantageously able to deal with any multipath detection, irrespective of its direction of arrival, provided it is separated in range from the real target (as it generally will be).

A specific advantage of this approach is that it does not require the use of more costly, processing intensive, adaptive beam nulling techniques for the suppression of multipath returns (although such techniques are not precluded). Furthermore, the technique does not rely on any knowledge regarding the local terrain map.

Beneficially, the ghost target profiles, once correctly assigned to the relevant true target, can be used to improve the classification of the true target. This is because a ghost target signature profile will generally be from the perspective of a different angle to that of the direct echo and can therefore provide additional angular diversity which is generally known to improve radar target classification. This classification enhancement is achievable because of the grouping of ghost target echoes with true target detections. Conventional radar sensors lack this ability to group ghost target echoes with direct detections and so the enhancement gained in classification performance, through such signature combination, cannot be realised.

Modifications and Alternatives

A number of specific examples of the cellular radar network, radar cell, radar receiver and radar transmitter have been described above in detail. As those skilled in the art will appreciate, however, a number of modifications and alternatives can be made to the above examples whilst still benefiting from the inventions embodied therein. By way of illustration only a number of these alternatives and modifications will now be described.

It will be appreciated, for example, that the regular arrangement of nine radar cells 112 in the radar network of FIG. 1 is used purely for reasons of clarity and ease of explanation. It will be appreciated that a deployed radar network will likely comprise an irregular arrangement comprising any suitable number radar cells 112 (including a single cell for small geographic coverage areas such as a small island or the like). It is envisaged that approximately twenty such cells would be required for the UK, for which many of the corners will coincide (in a manner similar to that shown in FIG. 1), resulting in a manageable number of sites at which radar nodes are located.

Although quadrilateral arrangements of radar nodes 114, and in particular square arrangements, offer benefits in terms of simplicity it will be appreciated that any polygonal arrangement of radar nodes 114 may be used that is suitable for the geographic area being covered. Moreover, different cells 112 of the radar network may be of different sizes and/or shapes in order to optimise radar coverage for a particular geographic area. Different arrangements may be necessary, for example, to take account on particular geographic, legal or other considerations that affect the siting of the radar stations. For example, cells can be configured in detail for the terrain or the available secure locations for sensors.

Whilst the radar cells 114 described above are each formed by a multi-static arrangement of comprising two radar transmitters and two radar receivers, any suitable number of transmitter and/or receivers (including a single transmitter and/or receiver) may be used and the number of transmitters may be different to the number of receivers. Further, in certain locations (especially at land extremities), any radar transmitter forming a radar cell may be co-located with a respective radar receiver of the cell.

Whilst some of the radar nodes shown in FIG. 1 have radar receivers only and others have radar transmitters only it will be appreciated that a similar cellular arrangement could be achieved with radar nodes comprising a combination of one or more radar receivers and one or more radar transmitters (e.g. receivers on one or more faces each observing a respective cell and transmitters on one or more faces each illuminating a respective cell). Moreover, radar receivers and transmitters for different but adjacent cells could be provided separately from one another rather than as part of a single radar node as shown.

It will be appreciated that whilst use of the L band is considered particularly attractive, however, if different priorities emerge it is possible in future to migrate to different frequencies of operation such as ultra high frequency (UHF) bands.

Whilst the radar cells are described as part of a network of such cells it will be appreciated that each such cell may be capable of independent operation in addition to integrated operation as part of the network.

Whilst arranging the pulse repetition frequency for completely unambiguous Doppler at velocity magnitudes of interest is of particular benefit, it will be appreciated that the system can also allow positional and/or motion information to be resolved in the presence of some Doppler ambiguity. For example, the radar receivers are able to obtain sufficient information (e.g. angular, positional, range-rate estimation based on multiple position fixes) to resolve some Doppler ambiguity (e.g. a single level of Doppler ambiguity representing two possible velocity values) if present.

The cellular network may be configured to provide Asterix ('All Purpose Structured Eurocontrol Surveillance Information Exchange') messages containing plan position and trajectories of aircraft targets over the instrumented volume. Additional message codes may contain height and amplitude. Further information about targets (vector velocity, classification) may also be made available, tailored to user requirements.

Data may be provided with an update rate of approximately 4 Hz. This will allow a degree of filtering and smoothing that may persist over a period comparable with current PSR scan intervals.

The source of each target report may be provided by the radar cell and/or the network server.

In addition to providing service throughout each cell of the network, information for out-of-area targets may also be derived and reported where possible. A selectable function may be provided as to whether information for such out-of-area targets is reported.

Target reports may typically be provided with a latency of, typically, 0.3 seconds or less from the time of the acquisition window. Acquisition windows typically occur continuously, without interruption due to scanning.

The update rate of the cellular network may, if required, be a rate in excess of that required by CAP 670 or EUROCONTROL standards, for example at over 3 Hertz.

Whilst the radar cell is aimed at tracking aircraft in manoeuvres consistent with civil aviation practice (up to 3 g for limited periods), more extreme manoeuvres may be accommodated.

Susceptibility to interference and/or jamming may be alleviated by ensuring that the radar receivers are protected by deep blocking filters (>80 dB), and/or have a very high dynamic range (14-bit ADC conversion for each receiver element (~+6 dB element gain)), allowing interferers to be accommodated to a high level without desensitization. Each receiver may be capable of operation in the presence of incoming signal intensities of −50 dBm, with an effective area of approximately—24 dBsm. This places a minimum on the required jamming emission at 100 km of over 300 kW for saturation.

The receiver may be provided with further capability to detect and diagnose jamming signals and their direction of arrival, and apply appropriate beam nulling and filtering to the signal in real time.

Whilst the described radar cell uses cross-nodal transmissions (that is, transmissions directly from a transmitter to each receiver) to synchronize the network directly and precisely, it will be appreciated that Global Positioning System (GPS) (or GNSS) timing or a land-communicated time reference may also be used for time coordination. The radar cell may also use be synchronised via a hierarchy of timing sources, which has the potential to provide additional accuracy and/or robustness (e.g. in the event of unit failures).

The radar network may be configured such that the transmitters operate in strict synchrony with each other. An appropriate synchronization approach may be used to synchronise the transmitters including, for example, the use of Global Positioning System (GPS) (or GNSS) timing and high-stability local clocks. Moreover, direct transmissions between pairs of transmitters and their associated receivers within the radar network may be used as the means for synchronization using, for example, the known positions of each to adjust the timing of transmissions and reception.

The cellular network approach may be configured to comply with interoperability requirements in the UK, Europe or other territories. Specifically, the network may be configured to comply, as a non-cooperative surveillance system, with the requirements stated in Annex I of EU Commissioning Implementing Regulation No 1207/2011 of 22 Nov. 2011.

The transmitters/receivers of the cellular network may be configured to use Asterix messaging to communicate aircraft positions.

The radar transmitter may operate in a continuous-wave mode.

Targets may be observed and detected at (and across) the boundaries between cells (where detections at one of the receivers of the cell cannot be used as effectively to determine positional information) by extending the process in which detections by two receivers within a cell are reconciled. The detections of receivers in adjacent cells may also be used to enhance such targets.

Whilst the cellular radar network is particularly useful for conventional civil aeronautical radar it may be extended to maritime radar.

The Meteorological Office currently uses spectrum in the L-band, S-band and C-band. The cellular radar network may be configured to mitigate the effects of weather related clutter (e.g. clouds) by, for example, ensuring that cloud formations do not lead to spurious aircraft tracks (owing to the sensor's ability to evaluate Doppler histories for different classes of target). However, the cellular radar network may also provide the added benefit of reporting separately the presence of aircraft, cloud masses and rainfall as well as explicitly discounting wind turbines.

We will be glad to explore this possibility with the Meteorological Office.

Various other modifications will be apparent to those skilled in the art and will not be described in further detail here.

The invention claimed is:

1. A multi-static radar system for providing broad area air traffic or defense surveillance, the radar system comprising:
   a plurality of radar receivers and a plurality of coherent synchronized radar transmitters operating with a common frequency and waveform and arranged in a multi-static configuration to form at least one radar cell to provide an area of radar coverage within said cell;
   wherein each radar transmitter is a static transmitter configured to persistently illuminate a respective radar cell with a radar signal comprising a sequence of radar pulses;
   wherein in operation, each radar cell is illuminated by at least two radar transmitters;
   wherein each radar transmitter is configured to transmit radar pulses of radio waves having a same respective waveform, transmission frequency and pulse repetition frequency;
   wherein each transmitter is synchronised or controlled as a part of the radar system;
   wherein each radar receiver is a static receiver configured to receive radar signals from within one or more respective radar cells, including radar return signals echoed from any object within said respective radar cell, as a result of illumination of said radar cell by at least one corresponding radar transmitter located remotely from that radar receiver; and
   means for processing the respective radar signals received at each radar receiver to determine information relating to at least one of position and motion of said object.

2. A radar system according to claim 1, wherein said radar receivers are arranged such that, in operation, each radar cell comprises at least two radar receivers arranged to receive signals from within that radar cell, including radar return signals echoed from any object within said respective radar cell wherein said radar cell comprises a polygonal coverage area having a plurality of vertices at each of which a respective radar transmitter, or radar receiver, is arranged for illuminating, or receiving radar signals from within, at least said polygonal coverage area.

3. A radar system according to claim 2, wherein said polygonal coverage area has at least one of a radar receiver located at one vertex thereof with another radar receiver located at a diagonally opposite vertex thereof and a radar transmitter located at one vertex thereof with another radar transmitter located at a diagonally opposite vertex thereof.

4. A radar system according to claim 1, wherein each radar receiver is configured to receive radar signals from within a respective radar cell, including radar return signals echoed from any object within said respective radar cell, as a result of illumination of said radar cell by a plurality of radar transmitters located remotely from that radar receiver and to distinguish between radar return signals echoed from any object within said respective radar cell as a result of illumination of said radar cell by a first of said plurality of radar transmitters and radar return signals echoed from any object within said respective radar cell as a result of illumination of said radar cell by a second of said plurality of radar transmitters.

5. A radar system according to claim 1, wherein each radar receiver and each radar transmitter is configured to synchronise with one another based on signals received from another one of said plurality of transmitters.

6. A radar system according to claim 1, wherein each radar receiver and each radar transmitter is configured to synchronise with one another based on signals from at least one of a satellite, a radio time clock such as MSF or a standard such as UTC.

7. A radar system according to claim 1, wherein said radar receivers are interconnected via a high speed communication link.

8. A radar system according to claim 1, wherein said plurality of radar receivers and said plurality of radar transmitters are arranged in a multi-static configuration to form a plurality of radar cells to provide an extended area of radar coverage within said plurality of cells wherein each transmitter comprises means for persistently illuminating said radar cell with a radar signal comprising a sequence of radar pulses at a predetermined pulse repetition frequency.

9. A radar system according to claim 8, wherein the radar system is configured to detect and determine said information for objects moving up to a maximum range rate and wherein said predetermined pulse repetition frequency is set sufficiently high to ensure that the range rate of an object moving at said maximum range rate can be determined unambiguously, from the Doppler shift imparted to said radar return signals, by said processing means.

10. A radar receiver for a multi static radar system according to claim 1, the radar receiver comprising means for receiving radar signals from a radar cell, including radar return signals echoed from any object within said radar cell, as a result of illumination of said radar cell by at least one radar transmitter located remotely from the radar receiver and processing means for processing the radar return signals echoed from an object and received at the radar receiver to determine said information relating to at least one of position and motion of said object.

11. A radar receiver according to claim 10, further comprising means for obtaining information relating to at least one of position and motion of said object relative to another radar receiver wherein said processing means are configured to determine said information relating to at least one of position and motion of said object relative to another radar receiver.

12. A radar receiver according to claim 10, wherein said processing means are configured to determine an angular position of the object relative to the radar receiver wherein said angular position of the object relative to the radar receiver comprises at least one of an elevation angle and an azimuth angle of the object relative to the receiver.

13. A radar receiver according to claim 12, wherein said processing means are configured to determine a position of the object relative to the receiver based on said angular position of the object relative to the radar receiver.

14. A radar receiver according to claim 10, wherein said processing means are configured to determine a range of the object relative to the receiver or a bi-static range, representing a combined range: from the radar receiver to the object; and from the object to a radar transmitter that transmitted radar signals that resulted in said radar return signals, echoed from said object, and on which said determination of range is based.

15. A radar receiver according to claim 14, wherein said processing means are configured to determine said range of the object relative to the radar receiver from an ambiguous set of at least two possible values for the range.

16. A radar receiver according to claim 15, wherein said processing means are configured to determine said range, from said ambiguous set of at least two possible values for the range, based on at least one of the angular position of the object relative to the radar receiver and a phase coding of transmitted radar signals that resulted in said radar return signals, echoed from said object, on which said determination of range is based, and information relating to at least one of position and motion of said object relative to the another radar receiver.

17. A radar receiver according to claim 14, wherein said processing means are configured to determine a position of the object relative to the receiver based on said range.

18. A radar receiver according to claim 10, wherein said processing means are configured to determine a respective range rate of the object in each of two directions and to determine a velocity magnitude and direction of the object based on said range rates of the object in said two directions.

19. A radar receiver according to claim 10, wherein said processing means are configured to maintain histories for each object detected by said radar receiver, wherein said histories comprise at least one of: Doppler, range, range rate, two-dimensional position, three-dimensional position, object tracking, angular position, velocity, and direction histories.

20. A radar receiver according to claim 10, wherein said processing means are configured to classify an object detected by said radar receiver as at least one of a target of interest or clutter based on said information relating to at least one of position and motion of said object.

21. A radar receiver according to claim 10, wherein said processing means are configured to process the radar return signals echoed from within said radar cell and received at the at least one radar receiver: to make a first detection of a target, wherein said first detection results from first radar return signals, originating from one of said transmitters, and echoed from said target; to make a second detection of said target, wherein said second detection results from second radar return signals, originating from another of said transmitters, and echoed from said target; to identify, for each of said first and second detections, from which of said transmitters the radar return signals resulting in that respective detection originated; to determine first positional information for said target based on said first radar return signals resulting in said first detection and information on the transmitter identified to be the originator of said first radar return signals; to determine second positional information for said target based on said second radar return signals resulting in said second detection and information on the transmitter identified to be the originator of said second radar return signals; and to determine refined positional information for said target based on said first and second positional information.

22. A radar receiver according to claim 10, wherein said processing means are configured: to process the radar return signals echoed from within said radar cell within a first process interval, representative of a first time on target, to detect a target and to provide information relating to said target; to determine, based on said information relating to said target, a second process interval, representative of a second time on target; and to process the radar return signals echoed from within said radar cell within a second process interval, representative of a second time on target, to provide at least one of further and refined information relating to said target.

23. A radar receiver according to claim 10, wherein said processing means are configured: to process the radar return signals echoed from within said radar cell to derive a Doppler spectrum for said return signals; to filter said Doppler spectrum using a median filter whereby to suppress Doppler spectrum associated with a moving source of radar interference; and to identify from said filtered Doppler spectrum whether said filtered Doppler spectrum comprises a Doppler signal indicative of a target of interest.

24. A radar receiver according to claim 10, wherein said processing means are configured: to process the radar return signals echoed from within said radar cell to derive a Doppler spectrum for said return signals; to identify based on said Doppler spectrum, sub-wavelength variations in phase arising from sub-wavelength motion of a target; and to determine target related information based on said sub-wavelength variations in phase.

25. A radar receiver according to claim 10, wherein said processing means are configured: to process the radar return signals echoed from within said radar cell to make a plurality of substantially simultaneous detections of a target, wherein at least one of said detections of said target is in a main receiver beam and another of said detections of said target in a sidelobe to said main receiver beam; and to determine based on the signal amplitude which of said detections is in said sidelobe and which of said detections is in said main receiver beam.

26. A radar receiver according to claim 10, wherein said processing means are configured: to process the radar return signals echoed from within said radar cell to make a plurality of substantially simultaneous detections of a target, wherein at least one of said detections of said target arises from radar return signals that are received directly from said target and at least one other of said detections of said target arises from radar return signals that are received indirectly from said target; and to determine which of said detections is received directly and which of said detections is received indirectly.

27. A radar receiver according to claim 10, wherein said processing means are configured to process the radar return signals echoed from within said radar cell within an adaptive process interval that can be adapted depending on target analysis requirements wherein said adaptive processing interval can be extended to allow enhanced analysis of said target or reduced to allow faster target detection.

28. A radar receiver according to claim 10, wherein said processing means are configured: to process the radar return signals echoed from within said radar cell to make at least one detection of a target; to determine at least one of an ambiguous range rate and an ambiguous range for said target; to resolve ambiguity in said at least one of an ambiguous range rate and an ambiguous range based on a phase coding sequence exhibited by said radar return signals.

29. A radar receiver according to claim 10, wherein said processing means are configured: to process the radar return signals echoed from within said radar cell to make at least one detection of a target, wherein said radar return signals comprise characteristics that represent dynamic target behaviour; to apply at least one branch of a pre-determined multi-branched model representing dynamic target behaviour to said radar return signals to identify a branch that approximates to the dynamic target behaviour represented by said characteristics, wherein each of a plurality of branches of said multi-branched model represents a different respective dynamic target behaviour; and to derive information relating to said target based on said identified branch of said pre-determined multi-branched model.

30. A method performed in a multi-static radar system for providing broad area air traffic or defense surveillance, wherein the multi-static radar system comprises a plurality of radar receivers and a plurality of coherent synchronized radar transmitters operating with a common frequency and waveform and arranged in a multi-static configuration to form at least one radar cell to provide an area of radar coverage within said cell, the method comprising:

each radar transmitter persistently illuminating a respective radar cell with a radar signal comprising a sequence of radar pulses, wherein each transmitter is synchronized or controlled as part of the radar system, wherein each radar cell is illuminated by at least two radar transmitters, and wherein each radar transmitter transmits radar pulses of radio waves having a same respective waveform, transmission frequency and pulse repetition frequency;

each radar receiver receiving radar signals from within one or more respective radar cells, including radar return signals echoed from any object within said respective radar cell, as a result of illumination of said radar cell, as a result of illumination of said radar cell by at least one corresponding radar transmitter located remotely from that radar receiver; and processing the respective radar signals received at each radar receiver to determine information relating to at least one of position and motion of said object.

* * * * *